US007532335B2

(12) United States Patent
Matsunaga et al.

(10) Patent No.: US 7,532,335 B2
(45) Date of Patent: May 12, 2009

(54) PRINT DATA SUPPLY APPARATUS, PRINTING APPARATUS, PRINT SYSTEM AND PRINT DATA TRANSMISSION METHOD

(75) Inventors: Shigeki Matsunaga, Kadoma (JP); Takahiko Nankou, Sanda (JP); Hideyuki Kuwano, Hirakata (JP)

(73) Assignee: Panasonic Corporation, Osaka (JP)

( * ) Notice: Subject to any disclaimer, the term of this patent is extended or adjusted under 35 U.S.C. 154(b) by 965 days.

(21) Appl. No.: 10/601,528

(22) Filed: Jun. 24, 2003

(65) Prior Publication Data

US 2004/0009022 A1 Jan. 15, 2004

(30) Foreign Application Priority Data

Jun. 25, 2002 (JP) ............................. 2002-185057

(51) Int. Cl.
*G06F 15/00* (2006.01)
*G06K 1/00* (2006.01)

(52) U.S. Cl. ..................... 358/1.13; 358/1.14; 358/1.15; 358/1.16

(58) Field of Classification Search ................ 356/1.15, 356/1.16; 715/854; 358/1.16, 1.15, 1.14, 358/1.9; 707/204, 1
See application file for complete search history.

(56) References Cited

U.S. PATENT DOCUMENTS

| 6,115,132 | A  | * | 9/2000  | Nakatsuma et al. ........ 358/1.14 |
| 6,353,484 | B1 | * | 3/2002  | Takashima ................ 358/1.15 |
| 6,456,308 | B1 | * | 9/2002  | Agranat et al. ............... 715/854 |
| 6,587,217 | B1 | * | 7/2003  | Lahey et al. ................ 358/1.15 |
| 6,594,677 | B2 | * | 7/2003  | Davis et al. .................. 707/204 |
| 6,785,019 | B2 | * | 8/2004  | Anderson et al. ............ 358/1.9 |
| 7,277,193 | B2 | * | 10/2007 | Bunn et al. ................. 358/1.15 |
| 2002/0143736 | A1 | * | 10/2002 | Krzyzaniak .................... 707/1 |
| 2003/0095284 | A1 | * | 5/2003  | Parry ........................ 358/1.16 |

FOREIGN PATENT DOCUMENTS

| JP | 10-312348   | 11/1998 |
| JP | 11-129586   | 5/1999  |
| JP | 11-353248   | 12/1999 |
| JP | 2000-132434 | 5/2000  |
| JP | 2000-353059 | 12/2000 |
| JP | 2000-353147 | 12/2000 |
| JP | 2001-197248 | 7/2001  |
| JP | 2001-218140 | 8/2001  |
| JP | 2001-292258 | 10/2001 |
| JP | 2002-156980 | 5/2002  |
| JP | 2002-183059 | 6/2002  |

* cited by examiner

*Primary Examiner*—Edward L Coles
*Assistant Examiner*—Satwant K Singh
(74) *Attorney, Agent, or Firm*—Wenderoth, Lind & Ponack, L.L.P.

(57) ABSTRACT

In order to provide a print system capable of push printing a print document consisting of a plurality of files formatted differently, an HDD unit 12 of the print system according to the present invention is a print data providing apparatus which provides a printer unit 13, connected to the print data providing apparatus via a transmission line, with a print document consisting of a plurality of print data files described in different formats and includes a storage subunit 12a which archives the plurality of the print data files into a single file and transmits the archived file to the printer unit 13.

36 Claims, 13 Drawing Sheets

Fig. 5

| CAPTURE command frame | |
|---|---|
| subfunction | (1) |
| status | (1) |
| result | (1) |
| destination_plug | (1) |
| print_job_ID | (12) |
| image_format_specifier | (2) |
| data_size | (4) |
| image_size_x | (2) |
| image_size_y | (2) |
| next_pic | (2) |
| next_page | (2) |

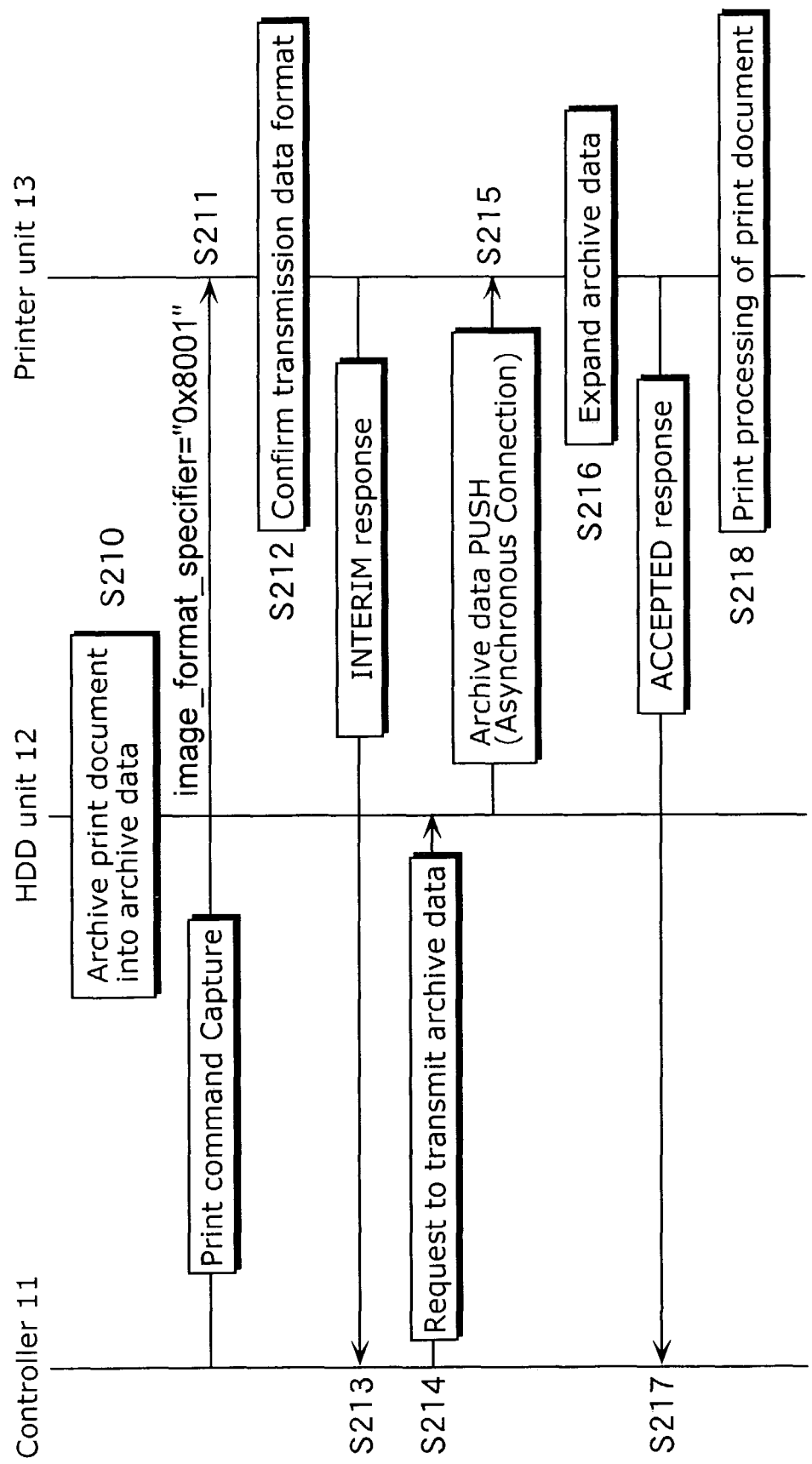

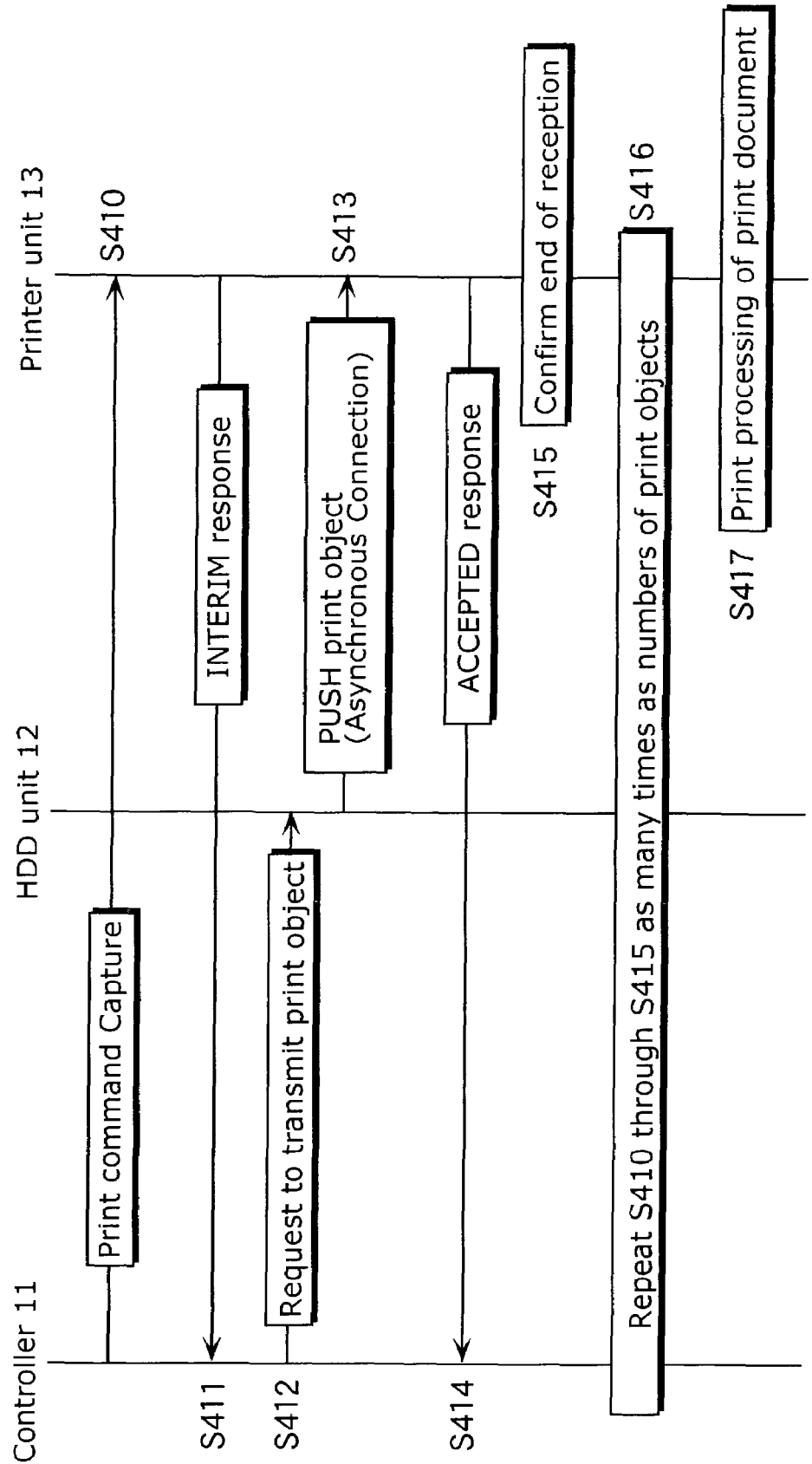

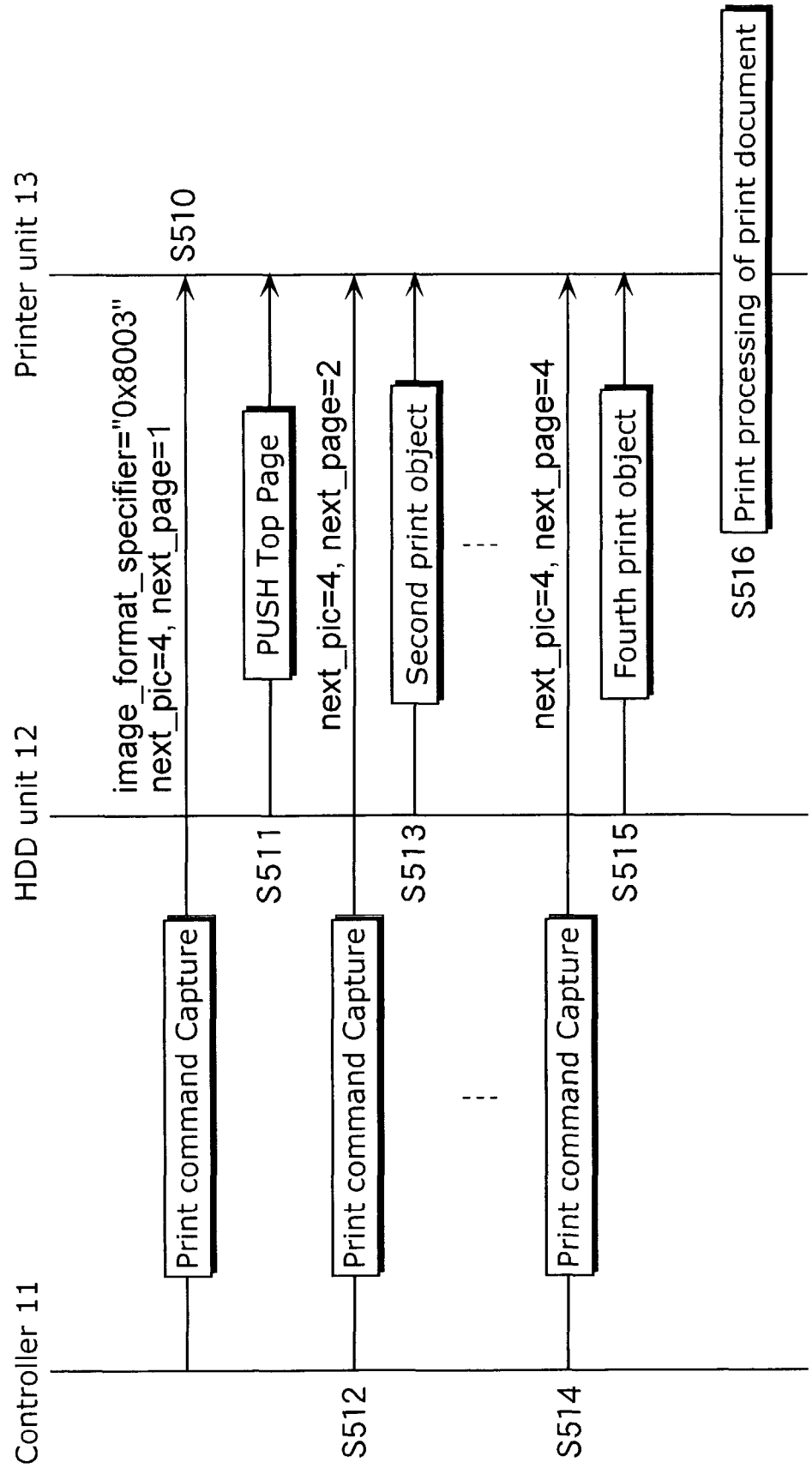

PRINT DATA SUPPLY APPARATUS, PRINTING APPARATUS, PRINT SYSTEM AND PRINT DATA TRANSMISSION METHOD

BACKGROUND OF THE INVENTION (1) Field of the Invention

The present invention relates to a method of transmitting print data to a printing apparatus, especially to a push printing when document data consists of a plurality of print objects formatted differently.

(2) Description of the Related Art

Recently, connecting a printing apparatus to an AV (Audio Visual) device such as a digital camera and a digital broadcast receiver (STB: Set Top Box) or the like in order to directly print a video that is shot or received by an AV device has been attempted.

Whichever AV device it may be that sends print instructions, it is desirable to obtain the same printing result at any time and also to reduce a processing of load on the side of a host device. Therefore, a print protocol which allows the print document data shot or received by the AV device to be directly transmitted from the AV device to the printing apparatus and also allows the printer side to perform processing to generate print picture data is necessary.

As one of the resolutions to respond to such a request, a Printer Subunit, one of the AV/C protocols defined by an IEEE 1394 standard, can be cited. The AV/C protocol relates to a connection of the AV devices, determines a standard protocol of basic essentials, maintains the compatibility, and provides a framework in which each maker can respectively enhance the functions of the device. Among the AV/C protocols mentioned above, the one which defines the AV/C command regarding especially the printing apparatus is called AV/C Printer Subunit. The detail concerning the AV/C Printer Subunit is described in "TA Document 1999038 AV/C Printer Subunit Specification 1.0" which is available at http://www.1394TA.org. The Printer Subunit defines a push printing of still picture data when a still picture is transmitted from the AV device to the printing apparatus for printing.

FIG. 1 is a sequence diagram showing an example of a communication procedure when an AV device such as a digital camera outputs a picture to a printing apparatus according to the existing AV/C Printer Subunit. Here, a communication sequence for outputting a print object such as a picture stored in a controller 900 connected via the IEEE 1394 bus to a printer unit (a printing apparatus) 910 as well as commands and responses then communicated are shown.

Firstly, the controller 900 obtains version information from the printer unit 910 (version verification phase) and establishes a logical transmission channel (a connection for Asynchronous data transmission; Asynchronous Connection) after specifying a job identifier job_ID for the printer unit 910 and then generating a print job (job creation phase).

The controller 900 then specifies a print object that it desires to output by sending an AV/C command CAPTURE to the printer unit 910 and outputs (push) the specified print object to the printer unit 910 via the transmission channel after instructing the printer unit 910 to receive the print object (object push phase).

When the printing is complete and an ACCEPTED response indicating end status is sent back from the printer unit 910 to the controller 900, the controller 900 disconnects the transmission channel of Asynchronous Connection (disconnection phase) and performs polling for the status of the job at the printer unit 910 (status poll phase) after closing the print job (job closure phase).

In this way, the printout is realized by the fact that the AV device outputs the print object to the printing apparatus according to the AV/C Printer Subunit without installing driver software unique to the printing apparatus.

Meanwhile, as for a print format such as HTML widely used for a document data delivery on the Internet today and XHTML-Print which has attracted attention recently, a single print document consists of a plurality of data (print object) described in different formats. In order to generate a print picture from a print document described with such XHTML-Print or the like, it is required to access randomly to a plurality of print objects described in different formats.

However, the printing apparatus cannot judge to which extent of push transmission the print document is composed of since the end of the transmission is not clearly shown when the access system mentioned above is realized by applying the aforementioned N column printing so as to store the print objects in the printing apparatus by sequentially push transmitting the print objects. Also, the printing apparatus cannot judge which type of print document a plurality of the print objects to be sequentially transmitted form. The same goes with other push printing protocols starting with the AV/C Printer Subunit and such a push printing protocol that push transmits all at once a plurality of data described in different formats from an AV device (a print data providing device) to a printing apparatus does not exist.

Therefore, in order to realize a system in which the same printing result can be obtained at any time when printing data described in a format such as XHTML-Print or the like using whichever type of AV device, it is required to apply a pull print protocol with which a printing apparatus performs generating processing of print picture data while sequentially requesting necessary print objects from an AV device.

The Japanese Application number 2002-024578 refers to a pull print protocol (an extension method of the AV/C Printer Submit is taken as an example) which enables a pull print of any form of print document including a print document consisting of a plurality of print objects described in different formats such as XHTML-Print.

However, a prior pull print protocol starting with the AV/C Printer Subunit contains a problem of increase in communication traffic since it is a printing apparatus that requests (pull) sequentially the print objects stored in the host side.

SUMMARY OF THE INVENTION

Accordingly, the object of the present invention is, in the light of the above-mentioned problem, to provide a print data providing apparatus, a printing apparatus and a print system, allowing a push printing of a print document regardless of the format. Namely, the present invention aims to provide a printing apparatus or the like, with which the same print result can be obtained at any time when print instructions are sent from whichever print data providing apparatus, and also, a processing load on the side of a host apparatus as well as a communication traffic generated in print processing are reduced.

In order to achieve the above objects, the print data providing apparatus according to the present invention provides an external device with a print document consisting of a plurality of print data files described in different formats and includes an archiving unit operable to archive said plurality of the print data files into a single file and an output unit operable to output the archived file to the external device. Here, the external device is, for instance, a printing apparatus connected to the print data providing apparatus via a transmission line, and the output unit transmits the archived file to the printing apparatus.

Thus, according to the print data providing apparatus of the present invention, a print document consisting of a plurality of the print data files described in different formats such as HTML, XHTMLP, JPG, PNG and BMP can be push transmitted as a single archived file to the printing apparatus. Therefore, in the case in which the print data providing apparatus is realized with whichever AV device, the effects are that the same printing result can be always obtained together with the reduction of the processing load on the side of the host apparatus since it is the printing apparatus that push prints the data and the decrease of the communication traffic caused in the print processing when the archived file is transmitted to the printing apparatus having functions (i) to expand the archived file into a plurality of print data files and (ii) to analyze the expanded print data files such as HTML and XHTMLP, combine the plurality of the print data files and print them out.

Another print data providing apparatus according to the present invention also provides a printing apparatus connected via a transmission line with a print document consisting of a plurality of print data files described in different formats and includes a sequential transmission unit operable to transmit sequentially the plurality of the print data files to the printing apparatus accompanied by information indicating that said plurality of the print data files to be transmitted are the print data files composing the print document.

Accordingly, another print data providing apparatus of the present invention can sequentially transmit a plurality of print data files described in different formats, said plurality of the print data files composing the print document, accompanied by information indicating that said plurality of the print data files are the print data files composing the print document. Therefore, the effect is that the printing apparatus can push prints the print document when the archived file is transmitted to the printing apparatus having functions (i) to detect, based on the information, that said plurality of the print data files to be transmitted sequentially are the print data files composing the print document and (ii) to analyze said plurality of the print data files when it is detected that said plurality of the print data files are the print data files composing the print document, acquire all the print data files composing the print document, combine the acquired print data files and print them out.

Thus, owing to the present invention, the practical value of the present invention is extremely high since the degree of freedom in printing a picture or the like under the system in which a plurality of home-use AV devices are connected by the IEEE1394 bus.

As for further information about technical background to this application, Japanese Patent Application No. 2002-185057, filed Jun. 25, 2002, is incorporated herein by reference.

BRIEF DESCRIPTION OF THE DRAWINGS

These and other subjects, advantages and features of the invention will become apparent from, the following description thereof taken in conjunction with the accompanying drawings that illustrate a specific embodiment of the invention. In the Drawings:

FIG. 5 is a diagram showing a parameter of a print instruction command "CAPTURE" of an existing IEEE1394 AV/C Printer Subunit.

FIG. 7 is a communication sequence diagram for push printing a print document consisting of a plurality of print objects using an archive push method under the system model shown in FIG. 4.

FIG. 9 is a communication sequence diagram when push printing a print document consisting of-a plurality of print objects using a multi-push transmission method under the system model shown in FIG. 4.

FIG. 10 is a diagram showing a concrete value of main parameters in a command "CAPTURE" to be transmitted from a controller in the communication sequence shown in FIG. 9.

DESCRIPTION OF THE PREFERRED
EMBODIMENT(S)

The following describes in detail an embodiment according to the present invention with reference to the attached diagrams. In the present embodiment, a broadcast wave is adopted for a communication between a broadcast station and a print data providing apparatus whereas an IEEE1394 is adopted as a communication media and an IEEE1394 AV/C Printer Subunit, as a print protocol in a communication between the print data providing apparatus and a printing apparatus. The present invention, however, is not limited to these mentioned above and the Internet, for instance, may be adopted for a communication between the broadcast station and the print data providing apparatus or an HTTP (Hyper Text Transfer Protocol) may be adopted as a data transmission protocol or a Print Basic Service Protocol of UpnP (Universal Plug and Play) and a Basic Printing Profile of Bluetooth may be adopted as a print protocol between the print data providing apparatus and the printing apparatus.

Figure 1:
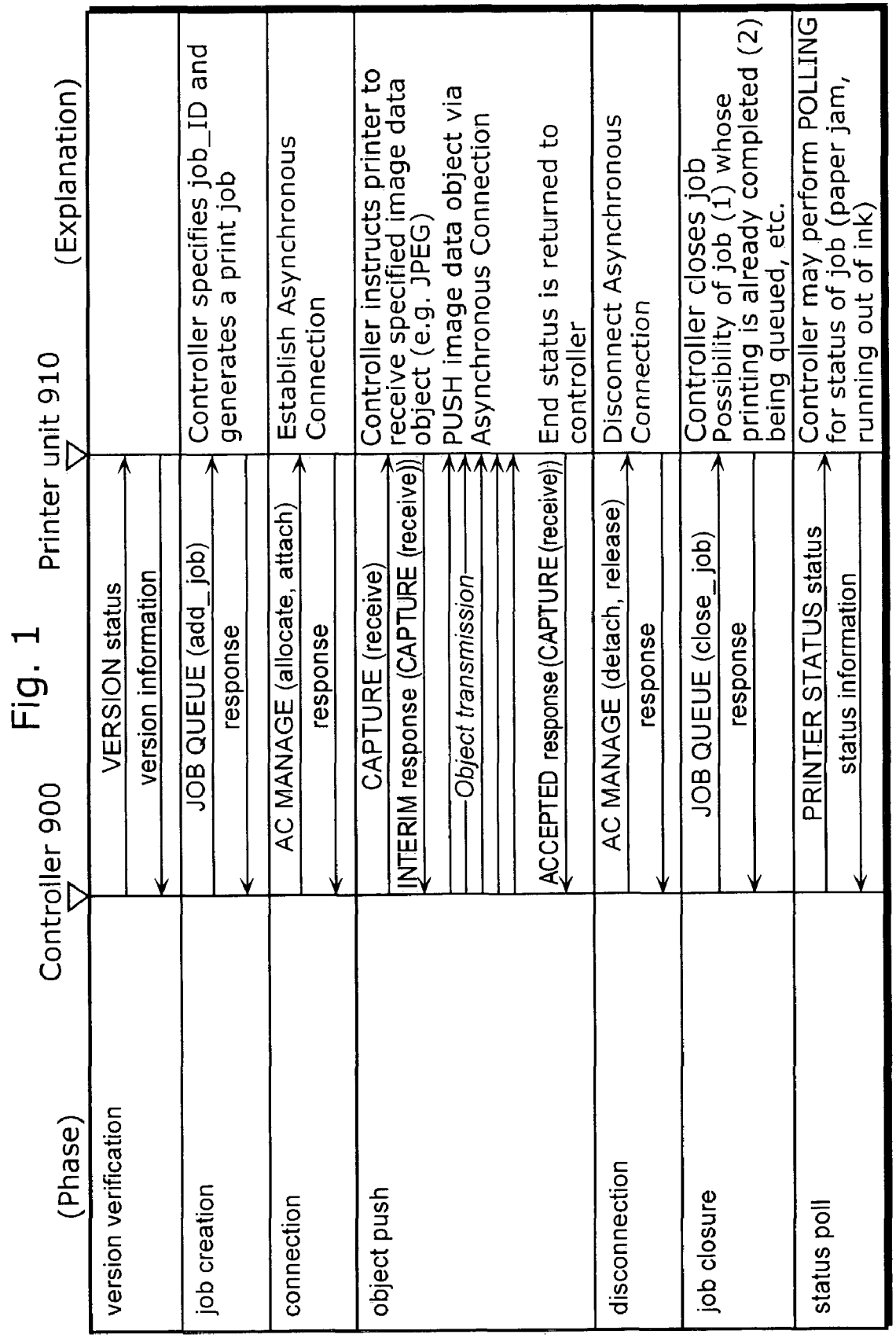
FIG. 1 is a communication sequence diagram showing an example of a communication procedure when an AV device such as a digital camera prints a picture out to a printing apparatus according to an existing AV/C Printer Subunit.
Figure 2:
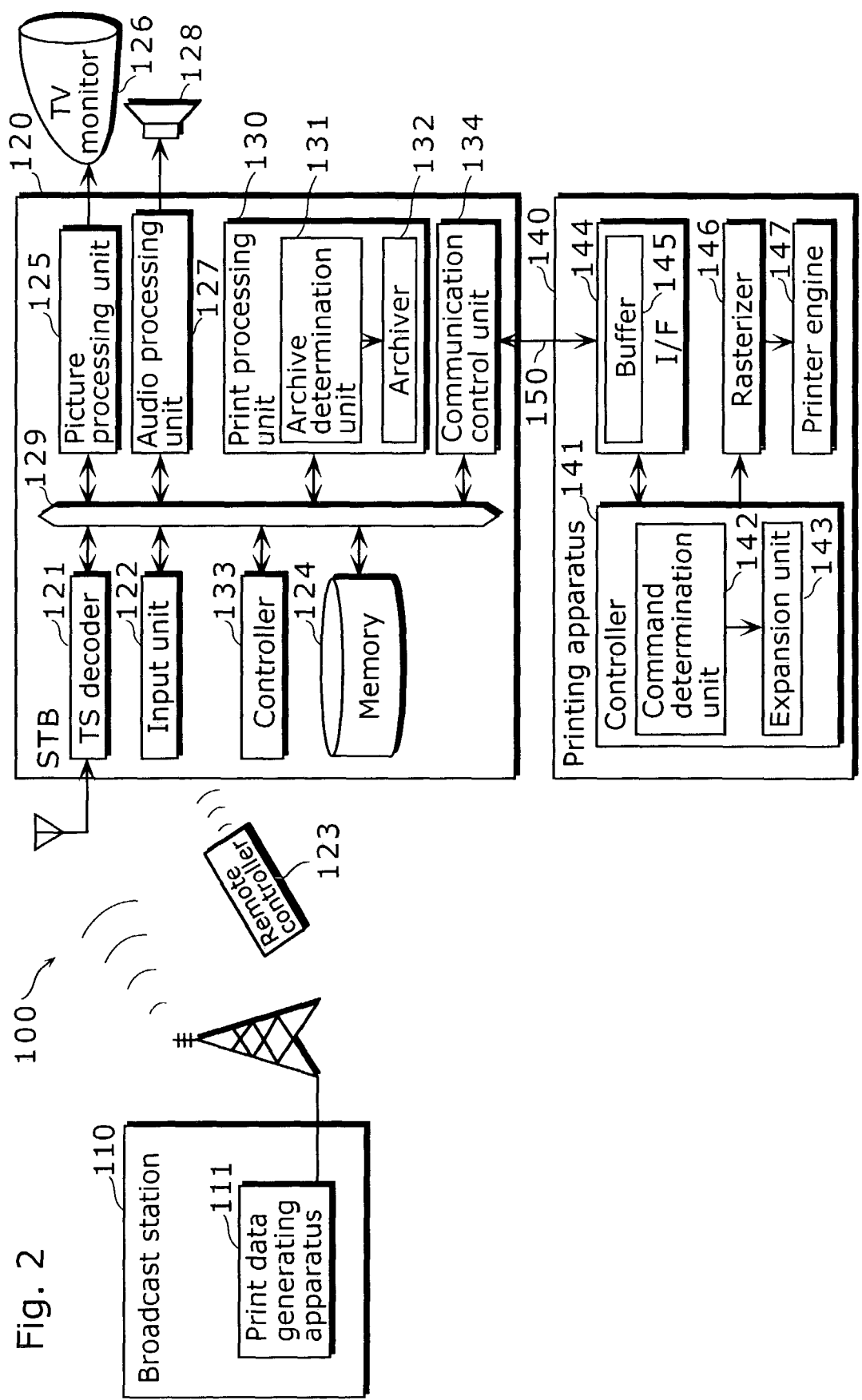
FIG. 2 is a block diagram showing an overall construction of a print system according to the present embodiment.

FIG. 2 is a block diagram showing a hardware configuration of a print system 100 according to the present embodiment. The print system 100 is a push printing system in which a print document consisting of a plurality of print objects described in different formats is outputted to a printer using either an archive push method or a multi-push transmission method of the present invention and includes a broadcast station 110, an STB 120, a printing apparatus 140 and an external bus 150. The broadcast station 110 broadcasts digital broadcast programs to each household and includes a print data generating apparatus 111. The print data generating apparatus 111 generates a print document such as a home page on the Internet described with the HTML, the XHTML-Print or the like, consisting of a plurality of print objects formatted differently.

The STB 120 is a communication terminal for home use equipped with functions to receive radio waves of the digital broadcast, extract audio, video and data signals from the received radio waves and have a TV monitor, a speaker or a printer reproduce and print each of the extracted signals out, and includes the following units: TS (Transport Stream) decoder 121, an input unit 122, a remote controller 123, a memory 124, a picture processing unit 125, a TV monitor 126, an audio processing unit 127, a speaker 128, an internal bus 129, a print processing unit 130, a controller 133 and a communication control unit 134. The print processing unit 130 further includes an archive determination unit 131 and an archiver 132.

The TS decoder 121 extracts from the received radio waves only broadcast data sent from the broadcast station 110 selected by a user and decodes it. The input unit 122 receives the user's input from the remote controller 123. The remote controller 123 transmits the signal corresponding to the user's button operation to the input unit 122 by infra-red radiation. The memory 124 stores print data contained in the broadcast data extracted by the TS decoder 121. The picture processing unit 125 is an MPEG decoder realized with LSI, a video board, a program or the like and extracts video data from the broadcast data extracted by the TS decoder 121 and generates display data by performing processing such as decoding. The TV monitor 126 is realized with CRT, a liquid display panel or the like and displays the display data generated by the picture processing unit 125. The audio processing unit 127 is an MPEG2-AAC decoder or the like realized with LSI or a program and extracts audio and sound data from the broadcast data extracted by the TS decoder 121 and generates analog sound signals by performing processing such as decoding. The speaker 128 reproduces the sound signals generated by the audio processing unit 127 and outputs a sound. The internal bus 129 is a data transmission line for each unit in the STB 120 to transmit data at high speed.

The print processing unit 130 extracts a print document from the broadcast data extracted by the TS decoder 121 and outputs it directly to the memory 124 when the extracted print document consists of archive data, a stand-alone file or a plurality of files described in identical format. However, when the extracted print document is described with the HTML and the XHTML-Print consisting of a plurality of files formatted differently, the print processing unit 130 archives the files so that the Top Page file to be firstly read in by the printing apparatus 140 may come at the head of the archive data and outputs the archived file to the memory 124. The archive determination unit 131 determines whether or not the data files to be referred to in a file such as the HTML and the XHTML-Print have been archived beforehand into a single file when the print document in the memory 124 is described with the HTML and the XHTML-Print. If they are not thus archived, the archive determination unit 131 transmits to the archiver 132 the files such as the HTML and the XHTML-Print containing these picture data files and has the archiver 132 archive them into a single file. In other cases, the print document is not transmitted to the archiver 132 but outputted to the memory 124 using a normal method. The archiver 132 archives a set of files differently formatted composing the print document obtained from the archive determination unit 131 into a single file using a format such as TAR (Tape Archival and Retrieval format), MIME (Multipurpose Internet Mail Extension), ZIP and LZH.

The communication control unit 134 transmits the print data from the STB 120 to the printing apparatus 140 and is connected to the printing apparatus 140 by the external bus 150. The external bus 150 is, for instance, an IEEE1394 bus. The communication control unit 134 reads out the relevant data from the memory 124 when the data is stored in the memory 124 operated by the print processing unit 130 and transmits the data to the printing apparatus 140 via the external bus 150.

The controller 133 controls the operations at each unit in the STB 120.

The printing apparatus 140 prints the print document acquired from the STB 120 and includes a controller 141, an I/F 144, a rasterizer 146 and a printer engine 147. The controller 141 including a command determination unit 142 and an expansion unit 143 controls the operations at each unit in the printing apparatus 140 as well as a timing in which a reference file is outputted from the expansion unit 143 to the rasterizer 146 so that the reference file is placed appropriately in the Top Page described with the HTML and the XHTML-Print by analyzing the Top Page of the print document expanded by the expansion unit 143. The command determination unit 142 determines whether the print document acquired from the STB 120 is archive data or not and transmits the acquired print document to the expansion unit 143 if it is the case, otherwise, to the rasterizer 146. The expansion unit 143 expands the print document acquired from the command determination unit 142 and restores the original set of files containing the Top Page and the reference files described with the HTML and the XHTML-Print.

The I/F 144 including a buffer 145 establishes a logical connection between the communication control unit 134 and itself via the external bus 150, analyzes a command for a push transmission issued by the communication control unit 134 and receives the transmission of the print document. The buffer 145 is a FIFO memory or the like realized with RAM. The rasterizer 146 converts the print document inputted from the controller 141 to a bit map data for printing. The printer engine 147 prints the printing contents of the print document on a paper based on the bit map data transmitted from the rasterizer 146.

Figure 3:
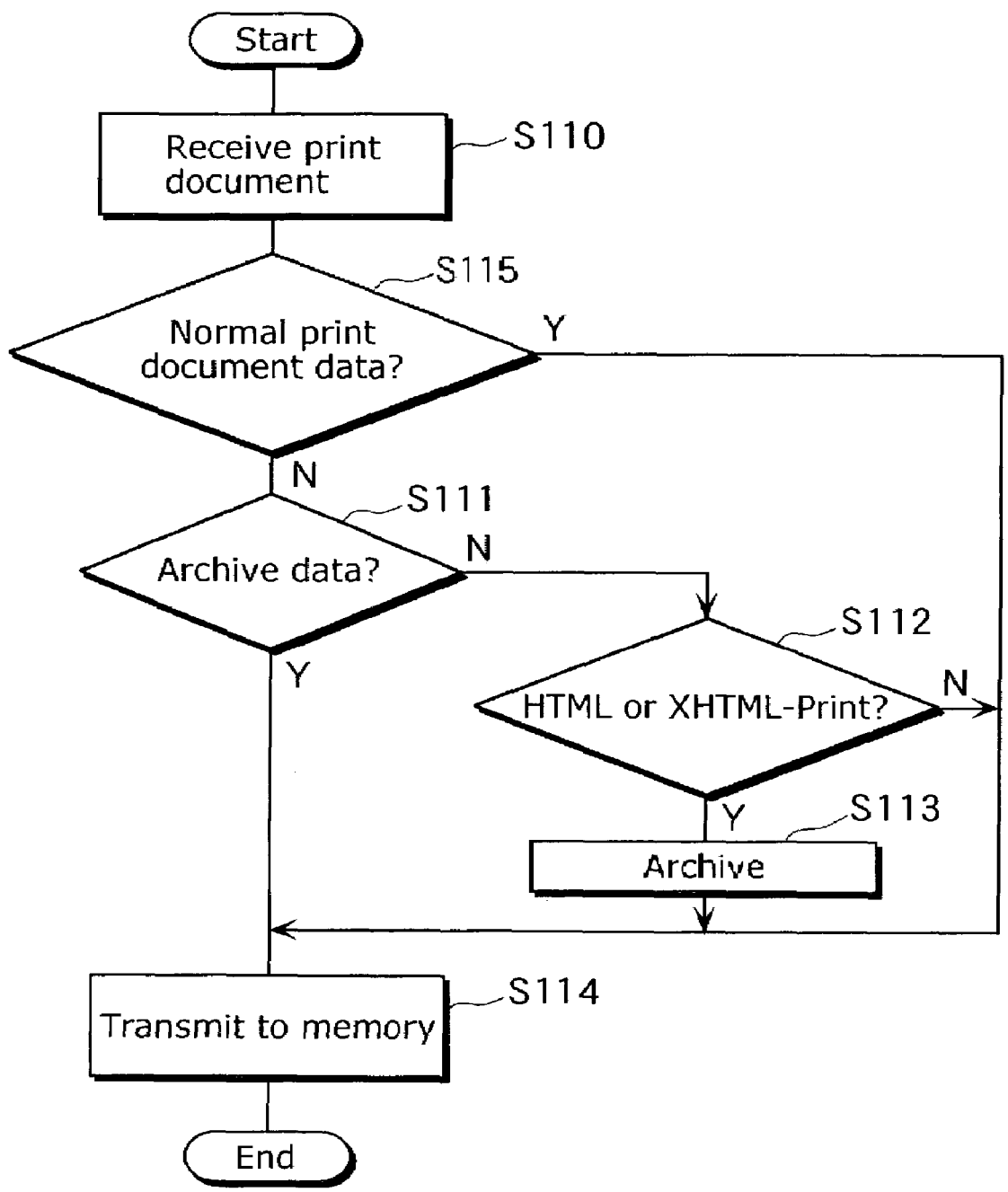
FIG. 3 is a flowchart showing an operation of print processing when a STB shown in FIG. 2 receives a print document from a broadcasting station.

An operation of the print processing unit 130 in the STB 120 of the print system 100 constructed as above is explained with reference to a flowchart of FIG. 3. FIG. 3 is a flowchart showing the operation of the print processing unit 130 when the STB 120 shown in FIG. 2 receives a print document from the broadcast station 110. When the STB 120 receives the print document from the broadcast station 110 (S 110), the print processing unit 130 takes the print document out of the broadcast data extracted by the TS decoder 121 and examines, based on the file extension of the print document, whether or not the extracted print document is one of a stand-alone file and a print document data consisting of a plurality of the files of the same format (S 115). When the extracted print document is a stand-alone file or a print document-data consisting of a plurality of the files of the same format, the print processing unit 130 outputs it directly to the memory 124 (S 114). In other cases, the print processing unit 130 examines whether the print document is archive data or not based on the file extension of the print document and the data header of the file (S 111). When the extracted print document is archive data, it is directly outputted to the memory 124 (S 114). When the print document is not archive data, the print processing unit 130 examines whether or not the print document consists of a plurality of the files formatted differently as in a case in which the Top Page described with the HTML and the XHTML-Print refers to data such as a picture or the like by means of links (S 112). If it is the case, the print processing unit 130 archives a plurality of files so that the Top Page file described with HTML and XHTML-Print comes at the head of the archive data (S 113) and outputs it to the memory 124 (S 114).

Figure 4:
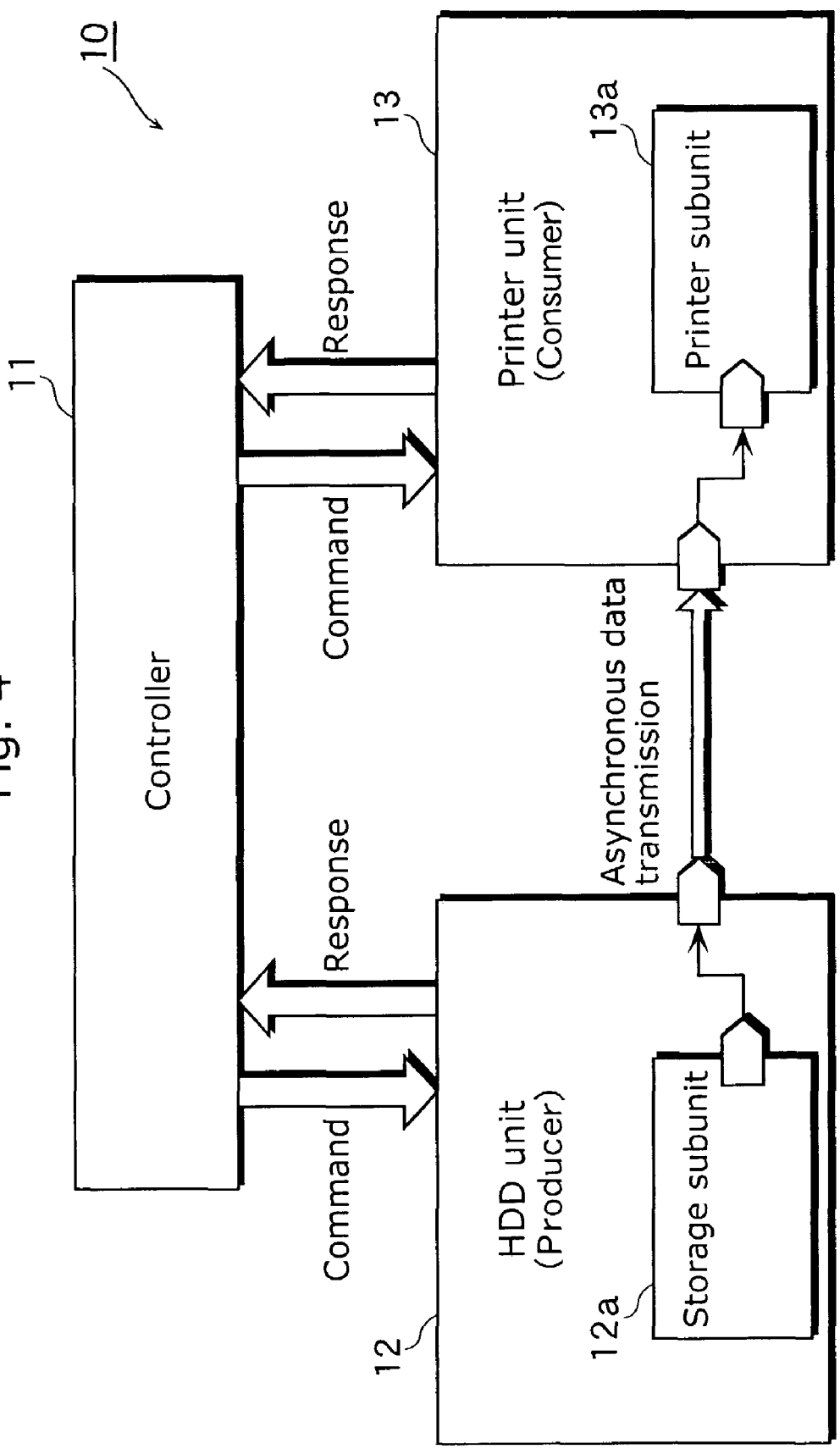
FIG. 4 is a diagram showing a system model that is a logical structure of the print system shown in FIG. 2.

FIG. 4 is a diagram showing a system model 10 that is a logical structure of the print system 100 shown in FIG. 2. This system model 10 includes a controller 11, an HDD unit 12 and a printer unit 13 connected by the IEEE1394. The basic structure is the same as the prior system model defined by the IEEE1394 AV/C Printer Subunit, but, is characterized by the contents of the parameters of the AV/C Printer Subunit Control command "CAPTURE", a command for instructing a push printing, and a format of the data, accompanying the command, to be push transmitted from the HDD unit 12 to the printer unit 13.

The controller 11 is, for instance, a device such as an STB 120 in which a management function for the connection on the IEEE1394 bus is mounted (for example, the print processing unit 130 shown in FIG. 2). The HDD unit 12 is a data transmitter (Producer) on the bus realized with a Hard Disk Drive (for example, the memory 124 shown in FIG. 2) and has a storage subunit 12a equipped with a data transmission function. An AV/C Camera Storage Subunit or the like can be introduced as an example of the storage subunit 12a. The printer unit 13 is a data receiver (Consumer) on the bus realized with a printing apparatus 140 or the like and has a printer subunit 13a equipped with a function to print the received data. An AV/C Printer Subunit or the like can be cited as an example of the printer subunit 13a. In the present embodiment, an AV/C Camera Storage Subunit is used as an example of the storage subunit 12a and an AV/C Printer Subunit is used as an example of the printer subunit 13a.

Meanwhile, a unit corresponds to an AV device whereas a subunit (virtual function unit) controls the functions of the AV device. A combination of subunits makes a unit, and by what function unit the unit is divided is determined accordingly. The subunit is also a virtual function unit and thereby does not necessarily correspond to a hardware configuration.

The characteristics shown in this diagram is that the commands directed to the HDD unit 12 and the printer unit 13 are issued only by the controller 11 and that the push printing operated by the printer unit 13 is realized when the controller 11 instructs the HDD unit 12 to transmit data (command and response) and the printer unit 13 to receive data. The print objects composing the print document are transmitted via a connection for Asynchronous data transmission (Asynchronous Connection) already established by the controller 11 or the like.

The controller 11, if explained as a controller subunit model in the IEEE1394 AV/C standard, controls not only the AV/C Printer Subunit (a printer subunit 13a) in the printer unit 13 but also the AV/C Camera Storage Subunit (a storage subunit 12a) in the HDD unit 12. According to the present embodiment, the controller 11 also controls the Asynchronous Connection, a connection for Asynchronous data transmission, and executes the establishment, reestablishment and disconnection of the Asynchronous Connection.

A communication sequence in the system model 10 of the present embodiment shown in FIG. 4 has different internal processing in the object push phase compared with that of existing AV/C Printer Subunit since the former allows a plurality of data described in different formats to be push transmitted all at once, which cannot be realized with the prior art.

Looking closely at a communication protocol, the contents of the parameters of the AV/C Printer Subunit Control command "CAPTURE" issued after the specific internal processing and the format of the print objects to be transmitted as an attachment are different from those of the prior art. Another difference is that in the communication sequence in question, processing of archiving a plurality of the print objects described in different formats into single data is performed so that the printer can easily perform print picture generating processing.

Here, the print document described with tagged languages such as the HTML and the XHTML-Print as mentioned before is a representative document showing a concrete example of a print document consisting of a plurality of print objects described in different formats. These print documents contain a Top Page described with the tagged language and a plurality of picture data described with the JPEG, the PNG, the GIF or the like linked from the Top Page. The print document described with the XHTML-Print is used as an example of a print document consisting of a plurality of print objects described in different formats, and it is explained that the print objects composing the print document shall contain a Top Page described with the tagged language defined by the XHTML-Print and a plurality of picture data linked (associated) from the Top Page. However, the print document according to the present invention is not restricted to this and it may be a print document described with other tagged languages.

The following describes the parameters of a command "CAPTURE" of the AV/C Printer Subunit. FIG. 5 is a diagram showing the parameters of the print instruction command "CAPTURE" of the existing IEEE1394 AV/C Printer Subunit. It shows operands (parameters added to the command) and the length (number of bytes) in the AV/C command frame of the command "CAPTURE". As shown in FIG. 5, the command "CAPTURE", as an operand, includes the following parameters: a parameter "subfunction"; return parameters "status" and "result"; a parameter "destination_plug"; a parameter "print_job_ID"; a parameter "image_format_specifier"; a parameter "data_size"; parameters "image_size_x" and "image_size_y"; and parameters "next_pic" and "next_page".

The parameter "subfunction" is a parameter specifying one of a plurality of concrete actions directed to the command "CAPTURE": receive, status, resume and abort. The parameters "status" and "result" are return parameters for sending back, to the controller 11, a status value and a value of printing result of the printer unit 13. The parameter "destination_plug" is a parameter for specifying an input port of the printer unit side (data receiver; consumer) for a connection. The parameter "print_job_ID" is a parameter for specifying a print job targeted for the command. The parameter "image_format_specifier" is used for specifying a format of the print objects composing a print document. The parameter "data_size" specifies a data size of the print objects to be transmitted. The parameters "image_size_x" and "image_size_y" are used for specifying the number of pixels (of the directions of X-axis and Y-axis) for image data. The parameters "next_pic" and "next_page" are return parameters used for specific commands.

Figure 6A:
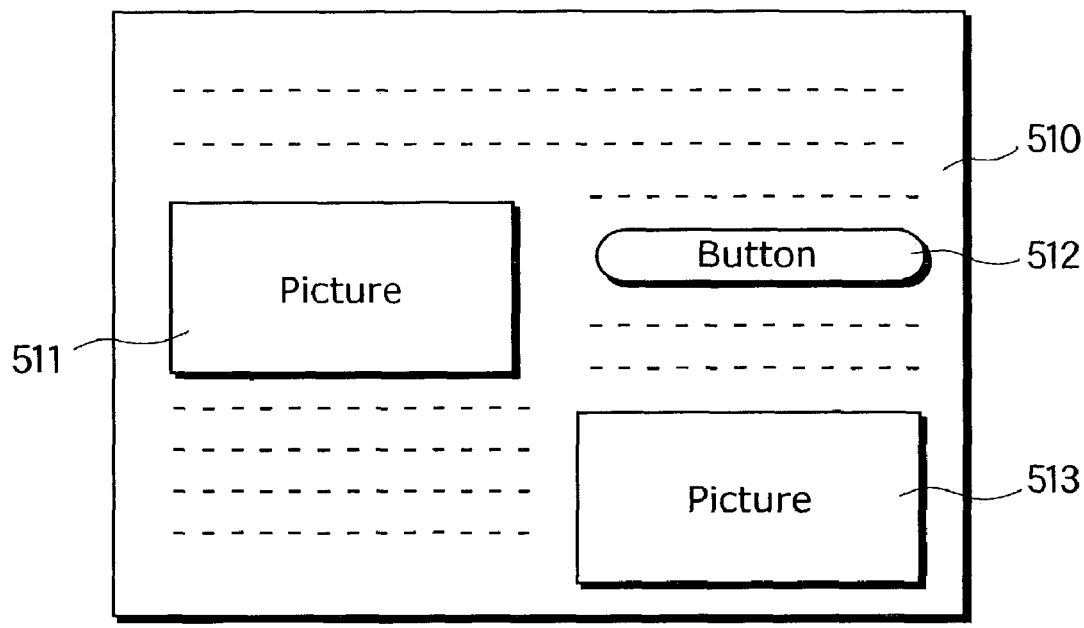
FIG. 6A is a diagram showing a print screen of a print document to be push printed under the system model shown in FIG. 4.
Figure 6B:
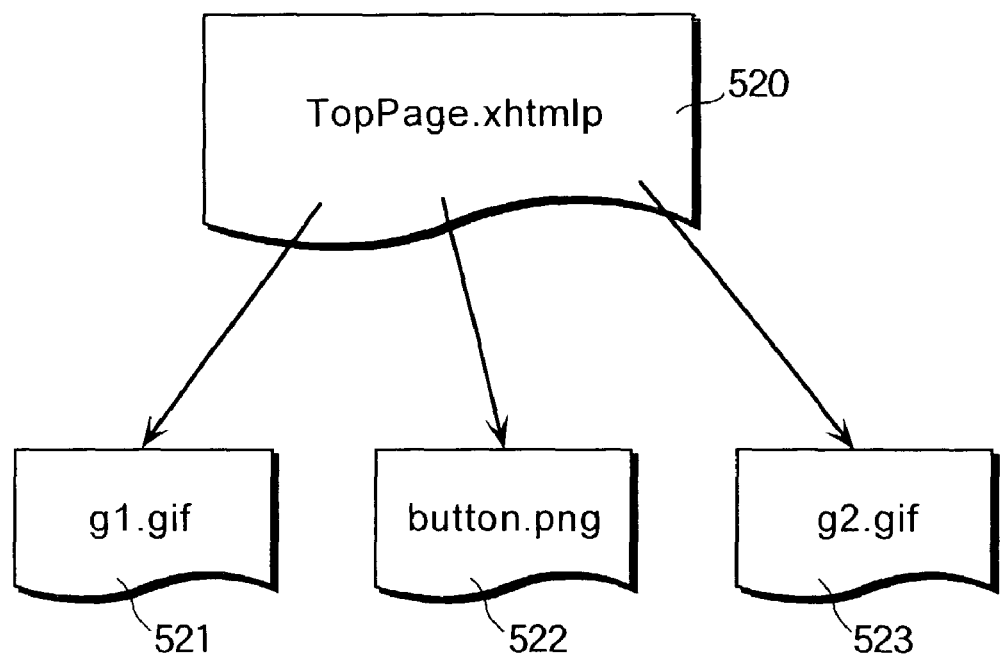
FIG. 6B is a diagram showing a mutual relation of a plurality of print objects composing a print document.

The detail is mentioned later on, however, the present embodiment solves the problem in the prior art by expanding the values specified by the parameters "image_format_specifier", "next_pic" and "next_page" among the parameters described above. Firstly, how the internal processing is operated in the object push phase according to the present embodiment in order to realize the push printing of the print document such as the XHTML-Print consisting of a plurality of the print objects described in different formats, which has been impossible with the prior art. FIG. 6A is a diagram showing a print screen of a print document 510 to be push printed under the system model 10 shown in FIG. 4. FIG. 6B is a diagram showing a mutual relation between a plurality of the print objects described in different formats, composing the print document 510. The print document 510, placing a picture 511, a picture 513 and a push button 512 at random in a character string, can be described as shown in FIG. 6A by using the tagged languages such as the XHTML-Print and the HTML. The part of the character string of the print document 510, for instance, is described in the XHTML-Print file 520 "TopPage.htmlp". The links to the picture file 521 "g1.gif" corresponding to the picture 511, the picture file.522 "button.png" corresponding to the push button 512 and the picture file 523 "g2.gif" corresponding to the picture 513 are described in the XHTML-Print file 520 "TopPage.xhtmlp" as shown in FIG. 6B.

Two methods can be cited for realizing the push printing of the XHTML-Print using a framework of the AV/C Printer Subunit. The first method is an archive push method to devise the printer so that the printer can easily perform print picture generating processing, archive a plurality of the print objects described in different formats into single data and push print it. FIG. 7 is a communication sequence diagram in the case of push printing the print document consisting of a plurality of the print objects using the archive push method under the system model 10 shown in FIG. 4. In the relevant method, an archive data push is used in Step S215 shown in FIG. 7 in the object push phase of the communication sequence according to the existing AV/C Printer Subunit.

First, a plurality of print objects (a print object group) such as a Top Page described with the HTML or the XHTML-Print and picture data associated with it are archived into archive format data (Step S210 in FIG. 7). The Tar format that can convert and archive a plurality of files into single binary data and the MIME format that can convert and archive a plurality of files into single text data (ASCII character string) or the like are used as an archive format. When a plurality of print objects are archived into single data, the printer which recreates it is designed to generate easily the print picture data. To be concrete, the printer has to determine which print object is the Top Page when generating print picture data from the print document described with the XHTML-Print. Therefore, the archive processing of the data is performed by changing the name of the print object of the Top Page into a name which was defined beforehand as a name of the print object (file name) of the Top Page to be transmitted from the HDD unit 12 to the printer unit 13 or placing the print object of the Top Page at the head of the archive data (or position already defined).

Figure 8A:
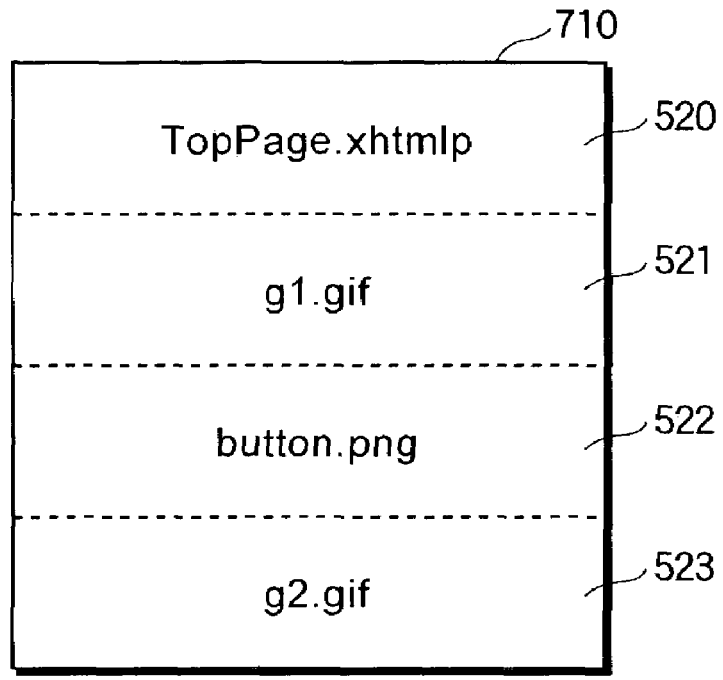
FIG. 8A is a diagram showing an example of archive data in which each of the print objects composing the print document shown in FIG. 6 is archived into a single file.
Figure 8B:
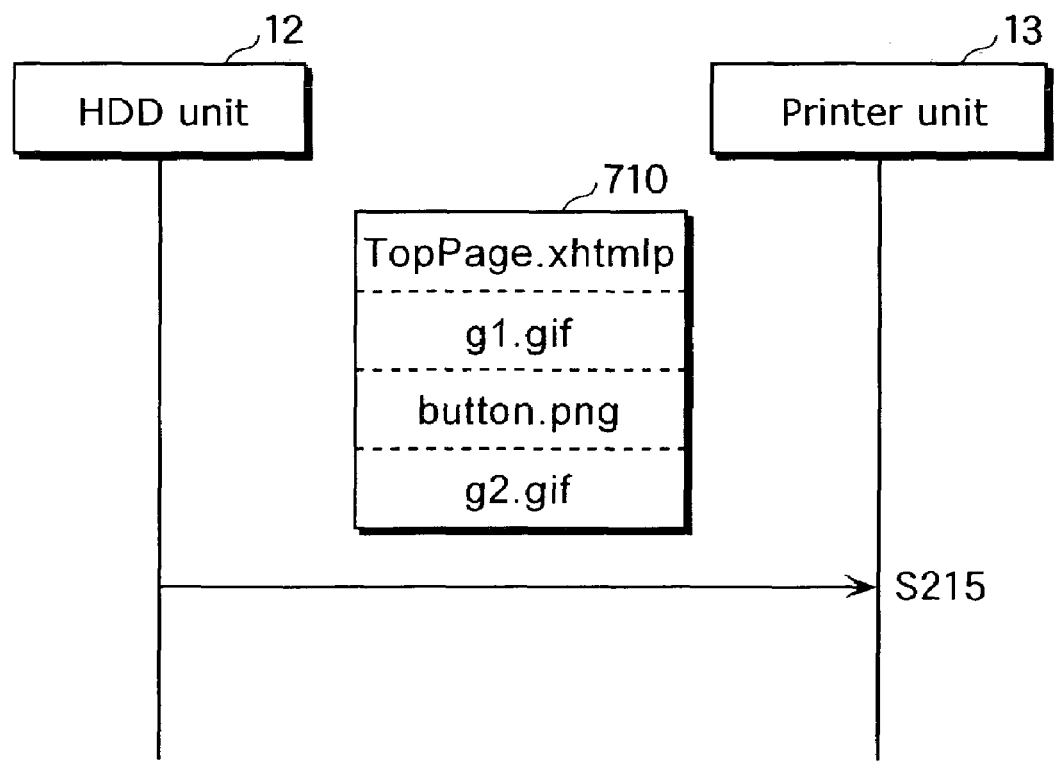
FIG. 8B is a diagram showing an example of archive data transmitted as a print document from an HDD unit to a printer unit.

FIG. 8A is a diagram showing an example of archive data 710 in which each of the print objects composing the print document 510 in FIG. 6 is archived into a single file. FIG. 8B is a diagram showing an example of the archived data 710 to be transmitted from the HDD unit 12 to the printer unit 13 as the print document 510. The archive data 710, for instance, is what the print document 510 is archived with the Tar format and consists of the XHTML-Print file 520 "TopPage.xhtmlp", the picture file 521 "g1.gif", the picture file 522 "button.png", and the picture file 523 "g2.gif" being connected sequentially from the top of the archive data 710. The data showing the placement of the archived files in the archive data 710 is attached to the archive data 710 archived with the Tar format, though not shown in the diagram. The archive push method of the present invention has the printer unit 13 print the print document 510 consisting of the print objects format-ted differently such as an XHTML-Print file, a GIF file and a PNG file by push transmitting the archive data 710 thus archived from the HDD unit 12 to the printer unit 13 just in a single time.

A compressed archive format such as a ZIP format and a LZH format may be used as an archive format other than the formats already mentioned above. In this case, CPU resource is necessary for compression and expansion processing, however, the amount of data transmission can be reduced. The execution of Step S210 in FIG. 7 shall be carried out basically following the instructions from the controller 11. The instructing method is not particularly limited, and the controller 11 may instruct the processing internally or perform the processing on its own when the controller 11 and the HDD unit 12 are present in the same apparatus. When the controller 11 and the HDD unit 12 are presented as independent apparatuses and are connected via a network, there is a need to set up separately a new protocol which instructs the HDD unit 12 to archive a print document into archive formatted data (Step S210 of FIG. 7). This step can be abbreviated when the print document is archive formatted from the beginning; however, it is necessary for the controller 11 to know that the print document is archive formatted before pursuing the subsequent steps by setting up a means for confirming the format of the print document.

Next, the controller 11 issues a command "CAPTURE" to the printer unit 13 (S211). Here, the parameter "image_format_specifier" shown in FIG. 5 shall specify that the data to be transmitted to the printer is archive formatted. An explicit value for specifying the archive data format in "image_format_specifier" is not defined in the "TA Document 1999038 AV/C Printer Subunit Specification 1.0", however, it is realized by applying Vendor Dependent category (from "0×8000" to "0×8FFF), an area in which a vendor can specify a unique print format. For example, in the case in which the print document described with the XHTML-Print is archived by the Tar format and push printed, the Vendor Dependent category is applied defining that a parameter value "0×8001" indicates an archive data format "XHTML-Print_Tar_Push-Print", and the controller 11 issues the AV/C Printer Subunit Control command "CAPTURE" specifying the "image_format_specifier" "0×8001" to the printer unit 13. The explicit value specifying the archive data format can surely be defined and standardized.

The printer unit 13, receiving the command "CAPTURE", confirms the parameter "image_format_specifier" and that the data subsequently push transmitted is archive data, prepares processing for the transmission (S212) and sends back to the controller 11 a response (INTERIM response) corresponding to the command "CAPTURE" (S213).

The controller 11, receiving the INTERIM response corresponding to the command "CAPTURE", requests the HDD unit 12 to transmit the archived data generated in Step S210 (S214); For example, when the HDD unit 12 includes the AV/C Camera Storage Subunit as a data transmission function, the controller 11 issues an AV/C Camera Storage Subunit Control command "SEND FILE" to the HDD unit 12.

The HDD unit 12, receiving the command "SEND FILE", transmits (push) the archived data via the Asynchronous Connection that is already established (S215). Here in the concrete example, it is assumed that the archive data 710 shown in FIG. 8B is pushed. The printer unit 13, realizing the reception of the archived data in Step S212, expands the received data and recreates the print document data (S216). In this case, the printer unit 13 identifies a name of the print object of the Top Page, for instance, "TopPage.xhtmlp" and records it when expanding the archived data in the case in which the print document data is processed into archive data so that the XHTML-Print file 520 "TopPage.xhtmlp" comes at the head of the archive data (or a fixed position). The processing of expanding the received archived data can be performed sequentially in Step S218 in which print picture data is, actually generated from the print document.

Next, the printer unit 13 sends back to the controller, 11 a final response corresponding to the command "CAPTURE" and starts lo print processing of the print document (S218). The following explains specifically the print processing of the print document operated by the printer unit 13. The print document described with the XHTML-Print contains the Top Page and the picture data linked from it and stored in the working storage area in the printer unit 13 by the processing operated in Step S216 of FIG. 7. An XHTML-Print interpreter in the printer takes the charge of the print processing operated in Step S218 of FIG. 7 and generates the print picture data from the print document.

Firstly, the Top Page file (i.e, TopPage.xhtmlp) is loaded from the working storage area and the TopPage data is parsed. In the embodiment of the present invention, it is easy to identify this TopPage. When the name of the print object of the Top Page is already defined in Step S210, the file of the Top Page is unique identifiable for its name. Meanwhile, the name of the print object of the Top Page is identified when the processing operated in Step S216 is performed in the case in which the data is archive processed in such a way that the print object of the Top Page comes at the head of the archived data (or in a fixed position). It is therefore possible to identify the file of the Top Page based on the name of the print object.

Two types of data, text data and image data, can be used as print picture information for the XHTML-Print interpreter; however, the XHTML-Print interpreter decides the layouts according to the information obtained by parsing the Top Page, generates/lays out the print picture of the text and image data subsequently, generates the final print picture data to be outputted on the paper and executes the printing. The text data is contained in the Top Page whereas the image data is linked to the picture file in the Top Page, therefore, the XHTML-Print interpreter loads the picture files, for example, a picture file 521 "g1.gif", a picture file 522 "button.png" and a picture file 523 "g2.gif" respectively stored in the working storage area and generates the print image of the image data.

The following describes the second method, a multi-push transmission method in which the push printing of the XHTML-Print is realized with the use of a framework of the AV/C Printer Subunit. The relevant method applies the parameters of the AV/C Printer Subunit Control command "CAPTURE", "image_format_specifier", "next_pic" and "next_page", and a communication sequence of Steps S510~S515 shown in FIG. 10 is performed in the archive push phase of Step S215 shown in FIG. 7. The contents of the parameters of the command "CAPTURE" is as mentioned before. The parameters "next_pic" and "next_page" are the return parameters in each of which a value is described by the AV/C Printer Subunit when they are returned. It is defined to substitute NULL "0xFFFF" when the AV/C Printer Subunit Control command "CAPTURE" is issued; however, the parameters "next_pic" and "next_page" to which values are substituted are returned as responses from the printer subunit 13a.

The relevant method is a method to push transmit a plurality of print objects composing a print document from the HDD unit 12 to the printer unit 13 by issuing the AV/C Printer Subunit Control command "CAPTURE" for more than one time and controls the number of times issuing the command "CAPTURE". Assume that "next_pic" presents a total number of the print objects composing the print document and that "next_page" presents the number of times issuing the command "CAPTURE", the printer subunit 13a understands that the reception of the command "CAPTURE" for the "next_pic" number of times in total and in total of "next_pic" number of times of the push transmissions for the print objects accompanying it take place until the push transmission of the print document is complete. At the same time, the printer subunit 13a also understands that the present command "CAPTURE" is issued for the "next_page" number of times. It does not matter if the roles of lo the parameters "next_pic" and "next_page" are the other way around. Also, a new command accompanying the same communication sequence as the AV/C Printer Subunit Control command "CAPTURE" may be set up and the parameters having the same roles as those assigned to the parameters "next_pic" and "next_page" may be newly created for the new command.

Also, the printer can perform smoothly the switching of processing by instructing the parameter "image_format_specifier" at the first issuance of the command "CAPTURE" that the number of times issuing "CAPTURE" is controlled in the parameters "next_pic" and "next_page". The print processing can also be performed smoothly by transmitting the data firstly required of in a specified order for print processing a Top Page file or the like in the printer.

Figure 11:
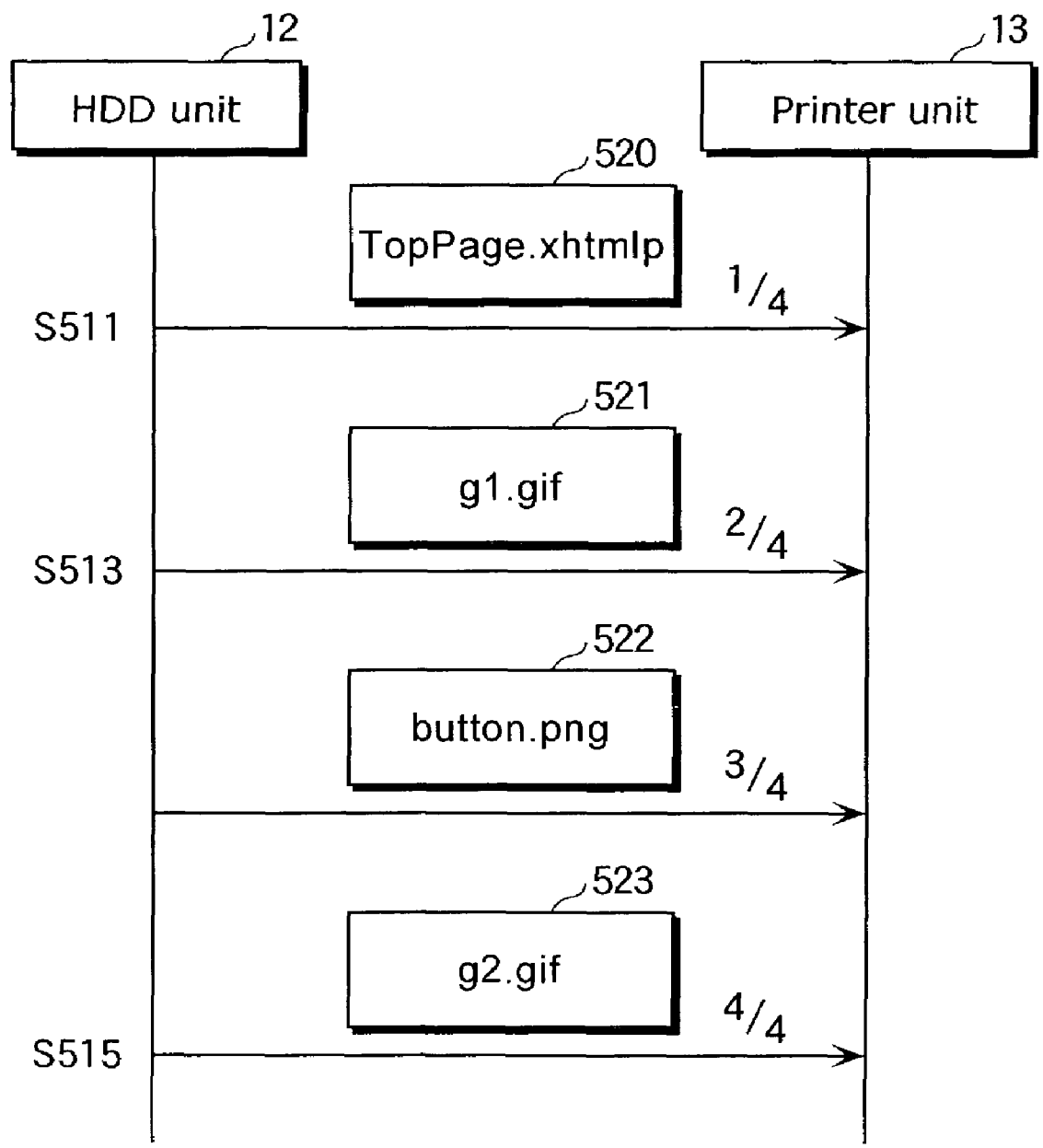
FIG. 11 is a diagram showing each of the print objects of the print document to be transmitted at each object push phase shown in FIG. 10.

The following describes a communication sequence when the print document 510 consisting of four print objects (a single Top Page data "TopPage.xhtmlp" and three picture data "g1.gif", "button.png" and "g2.gif") is push printed with reference to FIGS. 9, 10 and 11. FIG. 9 is a communication sequence diagram for push printing a print document consisting of a plurality of print objects by multi-push transmission method under the system model 10 shown in FIG. 4. FIG. 10 is a diagram showing concrete values of the parameters in the command "CAPTURE" transmitted from the controller 11 in the communication sequence illustrated in FIG. 9. FIG. 11 is a diagram showing each of the print objects in the print document 510 to be transmitted in each object push phase shown in FIG. 10.

The controller 11, grasping in advance which data the four print objects composing the print document correspond to, firstly issues an AV/C Printer Subunit Control command "CAPTURE" for push transmitting the Top Page to the printer unit 13 (S410 and S510). Here, the controller 11 specifies the values clearly indicating that the print document is a format consisting of a plurality of print objects formatted differently in the parameter "image_format_specifier" shown in FIG. 5 and that the print document is push transmitted with the issuance of the command "CAPTURE" for more than one time by expanding "next_page" and "next_pic". In the "TA Document 1999038 AV/C Printer Subunit Specification 1.0", the value clearly indicating the push transmission method is not defined, however, it is possible to handle this by applying, for example, Vendor Dependent category to the push transmission method and thereby defining the value "0x8003" as "Multiple Capture XHTML-Print". The explicit value can surely be defined and standardized. "4" indicating the total number of the print objects is inputted to the parameter "next_pic" and "1" indicating the first push transmission is inputted to the parameter "next_page".

The printer unit 13, receiving the command "CAPTURE" of which the above-mentioned parameters are set, confirms the parameters, thereby understands that four print objects are transmitted in total of four times of (multi) push transmission according to the values of the parameters "next_pic" and "next_page". At the same time, the printer unit 13 confirms that it is the first push transmission and that the data to be transmitted is the Top Page data of the print document described with the XHTML-Print format considering the fact that the parameter "next_page" presents "1" and sends back a response (INTERIM response) corresponding to the command "CAPTURE" to the controller 11 (S411). The controller 11, receiving the INTERIM response corresponding to the command "CAPTURE", requests the HDD unit 12 to transmit the Top Page data to the printer unit 13 (S412). For example, the controller 11 issues the AV/C Camera Storage Subunit Control command "SEND FILE" when the HDD unit 12 includes the AV/C Camera Storage Subunit as a data transmission function.

The HDD unit 12, receiving this, transmits (push) the Top Page data "TopPage.xhtmlp" to the printer unit 13 via the Asynchronous Connection which is an already established connection. (S413 and S511). The printer unit 13, receiving the Top Page data "TopPage.xhtmlp", sends back a final response corresponding to the command "CAPTURE" to the controller 11 (S414). The printer stands by to receive the next command "CAPTURE" (S415) since the four times of the push transmission defined by the parameter "next_pic" are not yet finished (the value of the parameter "next_pic" and that of the parameter "next_page" are not the same). The processing of S410 through S415 is repeated until the push transmission of all the print objects is complete (the value of the parameter "next_pic" and that of the parameter "next_page" are the same).

Namely, the controller 11 issues to the printer unit 13 the command "CAPTURE" of which "4" indicating the total number of the print objects is inputted to the parameter "next_pic" and "2" indicating the second push transmission is inputted to the parameter "next_page" (S512). The printer unit 13, receiving the command "CAPTURE", returns an INTERIM response to the controller 11 whereas the controller 11, receiving the INTERIM response, requests the HDD unit 12 to transmit to the printer unit 13 the second print object, although the process is abbreviated in the diagram. The HDD unit 12, receiving this, transmits (push) the second print object, for example, the picture data "g1.gif" to the printer unit 13 via the Asynchronous Connection, the connection that is already established (S513). The printer unit 13, receiving the second print object, the picture data "g1.gif", sends back a final response corresponding to the command "CAPTURE" to the controller 11 whereas the printer stands by to receive the next command "CAPTURE".

In the same way, the controller 11 inputs "4" to the parameter "next_pic" for the third print object, issues to the printer unit 13 the command "CAPTURE" of which "3" is inputted to the parameter "next_page" and has the HDD unit 12 transmit the third print object, for instance, the picture data "button.png", corresponding to the INTERIM response received from the printer unit 13. The controller 11 thus pushes sequentially the print objects to the printer unit 13, issues the command "CAPTURE" of which "4" is inputted to both of the parameters "next_pic" and "next_page" (S514) when receiving the final response of the command "CAPTURE" from the printer unit 13, corresponding to the third print object, and has the HDD unit 12 transmit the fourth print object, for instance, the picture data "g2.gif" corresponding to the INTERIM response received from the printer unit 13 (S515).

The printer unit 13 starts print processing when the push transmission of all the print objects is complete, which allows the start of the print processing of the print document (S417 and S516). In the present embodiment, it is defined that the print object of the Top Page is transmitted first (S410~S414). The XHTML-Print interpreter therefore can identify that the data firstly transmitted is the Top Page. The XHTML-Print interpreter can perform at the same time reception processing for the rest of the print objects and parsing processing for the Top Page by the fact that the print object of the Top page is firstly transmitted but not being limited particularly in what number it is transmitted. The two methods for realizing the push printing of the print document consisting of a plurality of the print objects are explained above. Thus, it is possible to print the print document consisting of a plurality of files differently formatted in a single job (in a single sheet) using either archive push method or multi-push transmission method.

The above has explained the print system according to the present invention based on the present embodiment; however, the present invention is not limited to this embodiment. In the present embodiment, for example, the STB, the HDD device and the printing apparatus are cited as concrete examples of a controller, a data transmitter (producer) and a data receiver (consumer), composing the print system. However, other than these apparatuses, a computer, a home bus controller or the like may function as a controller, a data providing device such as DSC, DTV, DVD (Digital Versatile Disk), a video camera or the like can be used as a data transmitter whereas a high-capacity storing device which stores the print objects and a communication device which transfers the print objects to another apparatus may be used as a data receiver.

Also, the print system of the present embodiment consists of the apparatuses connected via the IEEE1394 bus; however, a transmission line to connect the apparatuses is not restricted to this bus. The printing procedure according to the present invention can be applied to a communication system which has LAN (10BaseT or the like) and Internet as lower layers.

Figure 12:
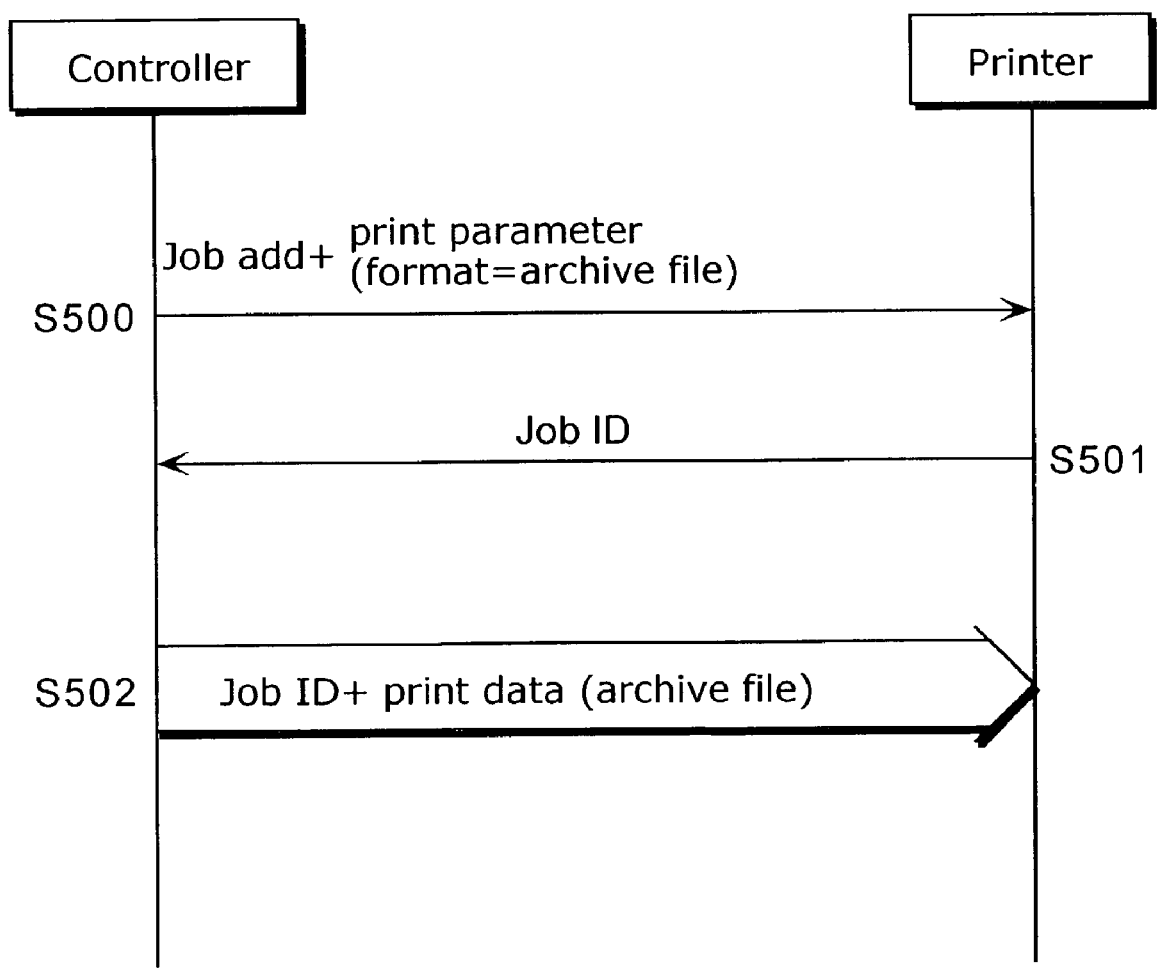
FIG. 12 is a diagram showing a communication sequence between a controller and a printer.
Figure 13:
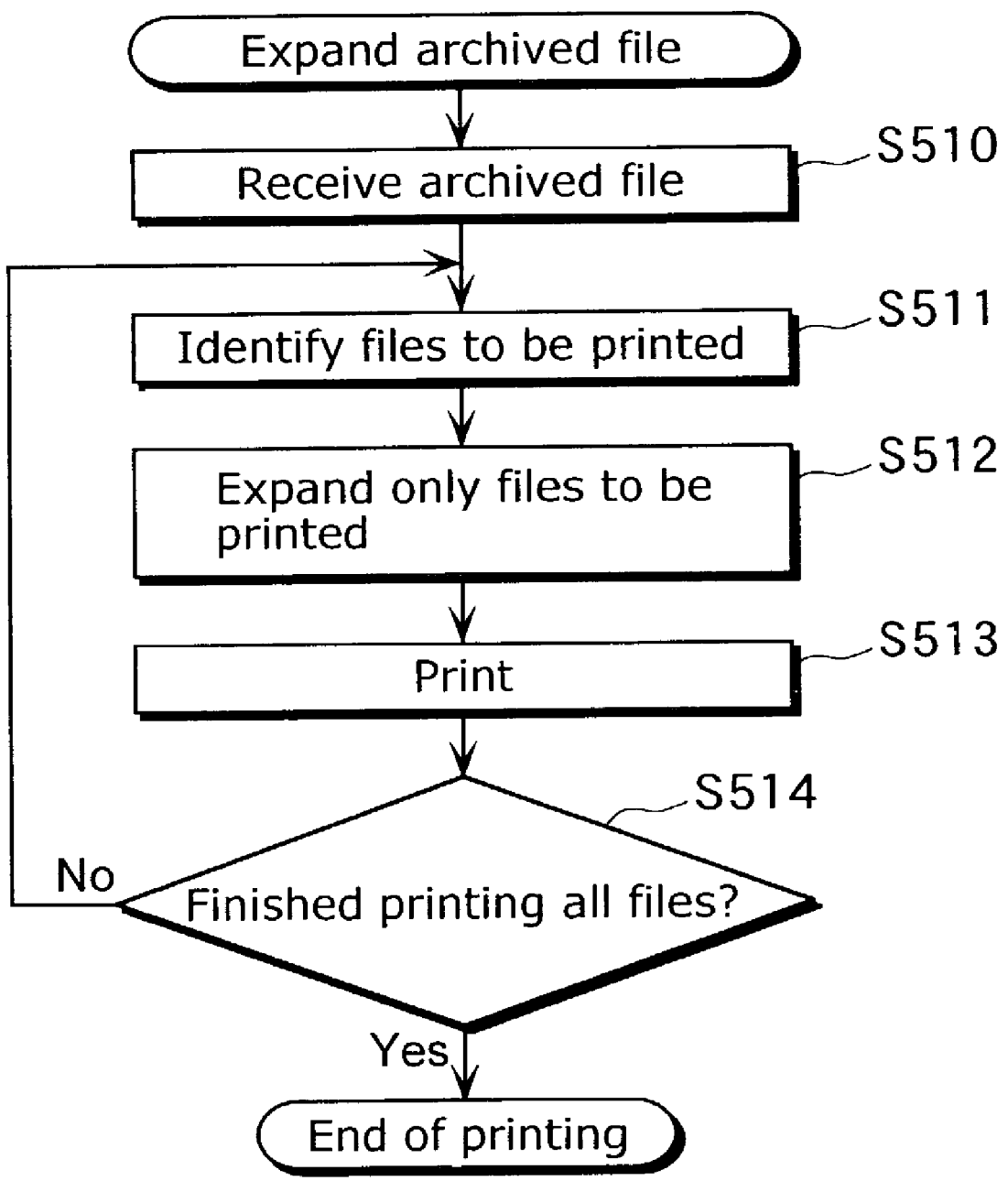
FIG. 13 is a flowchart showing a procedure of the printer to expand an archive file.

For example, the printing system according to the present invention can be applied to a common computer system under which a controller such as a personal computer and a printer are connected via a printer port, a wireless LAN or the like, as shown in FIG. 12. Here, the controller may firstly transmit to the printer a print request (Job add) accompanied by a print parameter for transmitting print data in an archive file format (S500), receive from the printer the job identifier corresponding to the request (S501) and then, transmit to the printer the print data in the format of archive file together with the job identifier (Job ID) (S502) in the case of employing the archive push method. In the case of employing the multi-push transmission method, for example, values indicating a total number of the print objects and what number of transmission of the print objects, such as the parameters "next_pic" and "next_page" used in the present embodiment, may be contained in the print parameter to be transmitted when the print request is made.

Also, the printer, receiving the archived file, may repeat processing in which only the files to be printed are extracted from the archived file, expanded and printed, for all the files contained in the archive file rather than to expand all at once a plurality of files contained in the archived file (S510~S514). Consequently, even for the case in which a plurality of compressed files are contained in the archived file, it requires a small memory capacity necessary for a working area since only a single file is expanded sequentially.

In the above-mentioned embodiment, it is explained that the print processing unit 130 archives the print document described with the XHTML-Print or the like into single data, however, they may be archived into one or more than one files. In the case in which the print document is archived into more than one file, for example, the files can be grouped by each data type such as a Top Page and a text file group or a Top Page and a picture file group.

Also, in the multi-push transmission method of the embodiment described above, the printer unit 13 is notified of the total number of the print objects composing the print document and the number of times issuing the command "CAPTURE" with the use of the parameters "next_pic" and "next_page", however, the present invention is not limited to this and the printer unit 13 may be informed of the end of the transmission of the print objects using either the parameter "next_pic" or the parameter "next_page". For example, the printer unit 13 may be informed of the end of the transmission of the print objects of the same print document by inputting in advance "1111" to either of the parameters "next_pic" and "next_page".

Furthermore, in the above embodiment, the printer unit 13 is informed of a transmission method of transmitting the print document which is either (i) archive push method or (ii) multi-push transmission method using the parameter "image_format_specifier", however, it is not always necessary to use neither the parameter "image_format_specifier" nor the parameters of the command "CAPTURE". For example, a function to analyze an expansion of a print object file or a header may be added to the printer unit 13 or described in the data of the print object file.

In the print system 100 shown in FIG. 2, the STB 120 outputs the print document to the printer 140 via the external bus 150, however, the present invention is not limited to such on-line printing and can be applied to, what is called, off-line printing. For example, when a removable storage medium such as a memory card or the like is mounted on an STB, the STB stores a print document in the storage medium. Then, the memory medium may be extracted from the STB, inserted into a printing apparatus to which the storage medium can be mounted so that the printing apparatus may print the print document stored in the storage medium.

The present invention can be realized as a print data generating apparatus 111 of a broadcast station 110, a STB 120 in each household, an AV device such as a digital camera or a printer 140, composing such print system 100 or as a print data transmission method with the print data generating apparatus 111 or the home-use STB 120, especially as a document printing method with the printer 140 or as a program which has a general-purposed computer execute the characteristics steps taken in the method. Such program can be distributed via a storage medium such as a CD-ROM or the like and a communication network or the like.

What is claimed is:

1. A print data providing apparatus for providing an external device with a print document comprised of a plurality of print data files described in different formats, said print data providing apparatus comprising:
    an archiving unit operable to archive the plurality of the print data files into an archived file; and
    an output unit operable to output the archived file to the external device,
    wherein said archiving unit archives the plurality of the print data files into the archived file after changing a name of one print data file of the plurality of the print data files to a specified name, the one print data file being a Top Page print data file, and the specified name being a predetermined name for allowing a printing apparatus to identify a print data file as the Top Page print data file,
    wherein the Top Page print data file is a predetermined print data file in the print document which is firstly required by the printing apparatus in order to print the print document, and
    wherein the printing apparatus interprets the Top Page print data file and places bit map data obtained by rasterization based on data of each of the print data files that the Top Page print data file references.

2. The print data providing apparatus according to claim 1, wherein said output unit transmits to the external device information on a format of the archived file and a format of the print data files that are archived into the archived file.

3. The print data providing apparatus according to claim 1, wherein said archiving unit archives the plurality of the print data files in a Tar Ball format.

4. The print data providing apparatus according to claim 1, wherein said archiving unit archives the plurality of the print data files in a MIME format.

5. The print data providing apparatus according to claim 1, wherein said archiving unit archives the plurality of the print data files in a compressed format.

6. The print data providing apparatus according to claim 1, further comprising:
    a receiving unit operable to receive the plurality of the print data files via a transmission line; and
    a first determination unit operable to determine whether or not the received plurality of the print data files compose a single print document,
    wherein said archiving unit archives the plurality of the print data files into the archived file when it is determined that the plurality of the print data files compose the print document as a result of the determination by said first determination unit.

7. The print data providing apparatus according to claim 1, further comprising:
    a receiving unit operable to receive the plurality of the print data files via a transmission line;
    a first determination unit operable to determine whether or not the received plurality of the print data files compose a single print document; and
    a second determination unit operable to determine whether or not the received print data files is archive data,
    wherein said archiving unit archives the print data files into the archived file when said second determination unit determines that the print data files are not archive data and said first determination unit determines that the print data files are a plurality of print data files composing a single print document.

8. The print data providing apparatus according to claim 1, wherein the external device is a printing apparatus connected to said print data providing apparatus via a transmission line, and
    said output unit transmits the archived file to the printing apparatus.

9. The print data providing apparatus according to claim 1, wherein the external device is a removable storage medium mounted on said print data providing apparatus.

10. A print data providing apparatus for providing an external device with a print document comprised of a plurality of print data files described in different formats, said print data providing apparatus comprising:
    an archiving unit operable to archive the plurality of the print data files into an archived file; and
    an output unit operable to output the archived file to the external device,
    wherein said archiving unit archives one print data file of the plurality of the print data files in a specified position in the archived file, the one print data file being a Top Page print data file, and the specified position being a predetermined position for allowing a printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

11. A print data providing apparatus for providing a printing apparatus connected to said print data providing apparatus via a transmission line with a print document comprised of a plurality of print data files described in different formats, said print data providing apparatus comprising a sequential transmission unit operable to sequentially transmit to the printing apparatus the plurality of the print data files accompanied by information indicating that the plurality of the print data files to be transmitted are the print data files composing the print document, wherein said sequential transmission unit transmits sequentially the plurality of the print data files accompanied by information on a total number of the plurality of the print data files composing the print document and a transmitting order of the plurality of the print data files composing the print document, wherein one of the plurality of print data files is a Top Page print data file, the Top Page print data file being a predetermined print data file in the print document which is firstly required by the printing apparatus in order to print the print document, wherein the printing apparatus interprets the Top Page print data file and places bit map data obtained by rasterization based on data of each of the print data files that the Top Page print data file references, and wherein the printing apparatus is able to identify the Top Page print data file on a basis of the transmitting order of the plurality of the print data files.

12. The print data providing apparatus according to claim 11, wherein the information is attached to one print data file to be transmitted first, of the plurality of the print data files to be transmitted.

13. The print data providing apparatus according to claim 11, wherein the information contains information on a format of the plurality of the print data files to be transmitted and a method of push transmitting the plurality of the print data files to the printing apparatus.

14. The print data providing apparatus according to claim 11, wherein said sequential transmission unit sequentially transmits the plurality of the print data files accompanied by information indicating a format of one print data file that is presently transmitted, of the plurality of the print data files.

15. The print data providing apparatus according to claim 14, wherein said sequential transmission unit sequentially transmits the plurality of the print data files with a data name presenting a format of each of the plurality of the print data files.

16. The print data providing apparatus according to claim 14, wherein said sequential transmission unit sequentially transmits the plurality of the print data files accompanied by a header indicating a format of each of the plurality of the print data file.

17. The print data providing apparatus according to claim 11, wherein said sequential transmission unit firstly transmits one print data file of the plurality of the print data files, the one print data file being required by the printing apparatus in order to print the print document.

18. The print data providing apparatus according to claim 11, further comprising:

a receiving unit operable to receive the plurality of the print data files via the transmission line; and a determination unit operable to determine whether or not the received plurality of the print data files compose the print document, wherein said sequential transmission unit sequentially transmits the plurality of the print data files, to the printing apparatus, accompanied by information indicating that the plurality of the print data files are the print data files composing the print document when it is determined that the plurality of the print data files compose the print document as a result of the determination by said determination unit.

19. A print data providing apparatus for providing a printing apparatus connected to said print data providing apparatus via a transmission line with a print document comprised of a plurality of print data files described in different formats, said print data providing apparatus comprising a sequential transmission unit operable to sequentially transmit to the printing apparatus the plurality of the print data files accompanied by information indicating that the plurality of the print data files to be transmitted are the print data files composing the print document, wherein one of the plurality of print data files is a Top Page print data file, the Top Page print data file being a predetermined print data file in the print document which is transmitted to the printing apparatus first out of the plurality of print data files composing the print document, wherein the printing apparatus interprets the Top Page print data file and places bit map data obtained by rasterization based on data of each of the print data files that the Top Page print data file references, and wherein said sequential transmission unit transmits the plurality of the print data files accompanied by a flag indicating a completion of the transmission, the flag being attached to one print data file to be transmitted to the printing apparatus last out of the plurality of the print data files composing the print document.

20. A printing apparatus for acquiring a print document from a print data providing apparatus connected to said printing apparatus via a transmission line, and for printing the acquired print document, said printing apparatus comprising:

an acquisition unit operable to acquire an archived file from the print data providing apparatus, the archived file being an archive of a plurality of print data files described in different formats, the plurality of the print data files composing a print document;

an expansion unit operable to expand the acquired archived file into each of the plurality of the print data files; and a print unit operable to print a print document, the print document being a combination of each of the expanded print data files, wherein the plurality of the print data files are archived into the archived file after a name of one print data file of the plurality of the print data files is changed to a specified name, the one print data file being a Top Page print data file, and the specified name being a predetermined name for allowing said printing apparatus to identify a print data file as the Top Page print data file, wherein the Top Page print data file is a predetermined print data file in the print document which is firstly required by said printing apparatus in order to print the print document, and wherein said printing apparatus interprets the Top Page print data file and places bit map data obtained by rasterization based on data of each of the print data files that the Top Page print data file references.

21. The printing apparatus according to claim 20, wherein said print unit further includes an analysis unit operable to analyze the one specified print data file after expanding the archived file into the expanded print data files, and to combine each of the expanded print data files so that a print picture presented by each of the expanded print data files may compose a single print document, and wherein said print unit is operable to print each of the expanded print data files according to the combination made by said analysis unit.

22. The printing apparatus according to claim 21, wherein said analysis unit analyzes the one print data file of the expanded print data files, the one print data file having the specified name, and combines each of the expanded print data files.

23. The printing apparatus according to claim 21, wherein said analysis unit analyzes the one print data file of the expanded print data files, and combines each of the expanded print data files, the one print data file being archived in a specified position in the archived file.

24. A printing apparatus for acquiring a print document from a print data providing apparatus connected to said printing apparatus via a transmission line, and for printing the acquired print document, wherein the print document is comprised of a plurality of print data files described in different formats, and said printing apparatus comprises:

a sequential acquisition unit operable to sequentially acquire, from the print data providing apparatus, the plurality of the print data files accompanied by information indicating that the plurality of the print data files compose the print document; and a print unit operable to detect, based on the information, that the acquisition of the plurality of the print data files composing the single print document is complete, and print the print document, the print document being a combination of each of the acquired print data files, wherein said sequential acquisition unit sequentially acquires the plurality of the print data files accompanied by information on a total number of the print data files composing the print document and a transmitting order of the plurality of the print data files composing the print document, wherein one of the plurality of print data files is a Top Page print data file, the Top Page print data file being a predetermined print data file in the print document which is firstly required by said printing apparatus in order to print the print document, wherein said printing apparatus interprets the Top Page print data file and places bit map data obtained by rasterization based on data of each of the print data files that the Top Page print data file references, and wherein said printing apparatus is able to identify the Top Page print data file on a basis of the transmitting order of the plurality of the print data files.

25. The printing apparatus according to claim 24, wherein said print unit detects, based on the information, that the acquisition of the total number of the print data files is complete, and prints the print document.

26. The printing apparatus according to claim 24, wherein said sequential acquisition unit acquires the plurality of the print data files composing the print document accompanied by a flag indicating a completion of a transmission of the plurality of the print data files, and said print unit detects that the acquisition of the print data files is complete based on the flag, and prints the print document.

27. A print data generating apparatus for generating print data files so that a printing apparatus may print a print document comprised of a plurality of print data files described in different formats, said print data generating apparatus comprising an archiving unit operable to archive the plurality of the print data files into a file after the printing apparatus changes a name of one print data file of the plurality of the print data files to a specified name, the one print data file being a Top Page print data file, and the specified name being a predetermined name for allowing the printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

28. A print data generating apparatus for generating print data files so that a printing apparatus may print a print document comprised of a plurality of print data files described in different formats, said print data generating apparatus comprising an archiving unit operable to archive one print data file of the plurality of the print data files in a specified position in an archived file, the one print data file being a Top Page print data file, and the specified position being a predetermined position for allowing the printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

29. A print system comprising a print data providing apparatus and a printing apparatus mutually connected via a transmission line, wherein the print data providing apparatus includes:

an archiving unit operable to archive a plurality of print data files described in different formats into an archive file, the plurality of the print data files composing a print document; and a transmission unit operable to transmit the archived file to the printing apparatus, wherein the printing apparatus includes:

an acquisition unit operable to acquire, from the print data providing apparatus, the archived file being an archive of the plurality of the print data files described in different formats, the plurality of the print data files composing the print document;

an expansion unit operable to expand the acquired archived file into each of the plurality of the print data files; and a print unit operable to print the print document, the print document being a combination of each of the expanded print data files, wherein the archiving unit archives the plurality of the print data files into the archived file after changing a name of one print data file of the plurality of the print data files to a specified name, the one print data file being a Top Page print data file, and the specified name being a predetermined name for allowing the printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

30. A print system comprising a print data providing apparatus and a printing apparatus mutually connected via a transmission line, wherein the print data providing apparatus includes:

a sequential transmission unit operable to transmit, to the printing apparatus, a plurality of print data files accompanied by information indicating that the plurality of the print data files to be transmitted compose a single print document, wherein the printing apparatus includes:

a sequential acquisition unit operable to sequentially acquire the plurality of print data files described in different formats accompanied by the information indicating that the plurality of the print data files compose a single print document; and a print unit operable to print the print document, the print document being a combination of each of the acquired print data files, after all of the plurality of the print data files composing a single print document are acquired, wherein the sequential transmission unit transmits sequentially the plurality of the print data files accompanied by information on a total number of the plurality of the print data files composing the single print document and a transmitting order of the plurality of the print data files composing the single print document, wherein one of the plurality of print data files is a Top Page print data file, the Top Page print data file being a predetermined print data file in the print document which is firstly required by the printing apparatus in order to print the print document, wherein the printing apparatus interprets the Top Page print data file and places bit map data obtained by rasterization based on data of each of the print data files that the Top Page print data file references, and wherein the printing apparatus is able to identify the Top Page print data file on a basis of the transmitting order of the plurality of the print data files.

31. A print data transmission method for a print system comprising a print data providing apparatus and a printing apparatus mutually connected via a transmission line, wherein the print data providing apparatus performs the steps of:

archiving a plurality of print data files described in different formats into an archived file, the plurality of the print data files composing a print document; and transmitting the archived file to the printing apparatus, wherein the printing apparatus performs the steps of:

acquiring, from the print data providing apparatus, the archived file being an archive of the plurality of the print data files described in different formats, the plurality of the print data files composing a print document;

expanding the acquired archived file into each of the print data files; and printing the print document being a combination of each of the expanded print data files, wherein the archiving step comprises archiving the plurality of the print data files into the archived file after changing a name of one print data file of the plurality of the print data files to a specified name, the one print data file being a Top Page print data file, and the specified name being a predetermined name for allowing the printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

32. A print data transmission method for a print system comprising a print data providing apparatus and a printing apparatus mutually connected via a transmission line, wherein the print data providing apparatus performs a sequential transmission step of sequentially transmitting, to the printing apparatus, a plurality of print data files accompanied by information indicating that the plurality of print data files to be transmitted compose a single print document, and the printing apparatus performs the steps of:

acquiring sequentially, from the print data providing apparatus, the plurality of the print data files described in different formats accompanied by information indicating that the plurality of the print data files compose a single print document;

printing the print document, the print document being a combination of each of the acquired print data files, after all of the plurality of the print data files composing a single document are acquired, wherein the sequential transmission step comprises transmitting sequentially the plurality of the print data files accompanied by information on a total number of the plurality of the print data files composing the single print document and a transmitting order of the plurality of the print data files composing the single print document, wherein one of the plurality of print data files is a Top Page print data file, the Top Page print data file being a predetermined print data file in the print document which is firstly required by the printing apparatus in order to print the print document, wherein the printing apparatus interprets the Top Page print data file and places bit map data obtained by rasterization based on data of each of the print data files that the Top Page print data file references, and wherein the printing apparatus is able to identify the Top Page print data file on a basis of the transmitting order of the plurality of the print data files.

33. A computer-readable medium having a program stored thereon for causing a print data providing apparatus to execute a method for providing an external device with a print document comprised of a plurality of print data files described in different formats, the method comprising:

archiving the plurality of the print data files into an archived file; and outputting the archived file to the external device, wherein said archiving comprises archiving the plurality of the print data files into the archived file after changing a name of one print data file of the plurality of the print data files to a specified name, the one print data file being a Top Page print data file, and the specified name being a predetermined name for allowing a printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

34. A computer-readable medium having a program stored thereon for causing a data providing apparatus to perform a method for providing an external device with a print document comprised of a plurality of print data files described in different formats, the method comprising a sequential transmission step of sequentially transmitting, to the external device, the plurality of the print data files accompanied by information indicating that the plurality of the print data files to be transmitted compose the print document, wherein said sequential transmission step comprises sequentially transmitting the plurality of the print data files accompanied by information on a total number of the print data files composing the print document and a transmitting order of the plurality of the print data files composing the print document, wherein one of the plurality of print data files is a Top Page print data file, the Top Page print data file being a predetermined print data file in the print document which is firstly required by the printing apparatus in order to print the print document, wherein the printing apparatus interprets the Top Page print data file and places bit map data obtained by rasterization based on data of each of the print data files that the Top Page print data file references, and wherein the printing apparatus is able to identify the Top Page print data file on a basis of the transmitting order of the plurality of the print data files.

35. A computer-readable medium having a program stored thereon for causing a printing apparatus to execute a method for acquiring a print document from a print data providing apparatus connected to the printing apparatus via a transmission line, and for printing the acquired document, the method comprising:

acquiring, from the print data providing apparatus, an archived file being an archive of a plurality of print data files described in different formats, the plurality of the print data files composing a print document;

expanding the acquired archived file into each of the plurality of the print data files; and printing the print document being a combination of each of the expanded print data files, wherein the plurality of the print data files are archived into the archived file after a name of one print data file of the plurality of the print data files is changed to a specified name, the one print data file being a Top Page print data file, and the specified name being a predetermined name for allowing the printing apparatus to identify a print data file as the Top Page print data file, wherein the Top Page print data file is a predetermined print data file in the print document which is firstly required by the printing apparatus in order to print the print document, and wherein the printing apparatus interprets the Top Page print data file and places bit map data obtained by rasterization based on data of each of the print data files that the Top Page print data file references.

36. A computer-readable medium having a program stored thereon for causing a printing apparatus to execute a method for acquiring a print document from a print data providing apparatus connected to the printing apparatus via a transmission line, and for printing the acquired print document, wherein the print document comprises a plurality of print data files described in different formats, the method comprising:

acquiring sequentially, from the print data providing apparatus, the plurality of the print data files accompanied by information indicating that the plurality of the print data files compose a single print document; and detecting, based on the information that the acquisition of the plurality of the print data files composing the single print document is complete, and printing the print document being a combination of each of the acquired print data files, wherein the plurality of the print data files acquired sequentially from the print data providing apparatus are accompanied by information on a total number of the plurality of the print data files composing the single print document and a transmitting order of the plurality of the print data files composing the single print document, wherein one of the plurality of print data files is a Top Page print data file, the Top Page print data file being a predetermined print data file in the print document which is firstly required by the printing apparatus in order to print the print document, wherein the printing apparatus interprets the Top Page print data file and places bit map data obtained by rasterization based on data of each of the print data files that the Top Page print data file references, and wherein the printing apparatus is able to identify the Top Page print data file on a basis of the transmitting order of the plurality of the print data files.

* * * * *